US011388334B2

(12) United States Patent
Li et al.

(10) Patent No.: US 11,388,334 B2
(45) Date of Patent: Jul. 12, 2022

(54) AUTOMATIC CAMERA GUIDANCE AND SETTINGS ADJUSTMENT

(71) Applicant: QUALCOMM Incorporated, San Diego, CA (US)

(72) Inventors: Muhua Li, San Diego, CA (US); An Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/071,971

(22) Filed: Oct. 15, 2020

(65) Prior Publication Data

US 2021/0368094 A1 Nov. 25, 2021

Related U.S. Application Data

(60) Provisional application No. 63/029,214, filed on May 22, 2020.

(51) Int. Cl.
*H04N 5/232* (2006.01)
*G06N 20/00* (2019.01)

(52) U.S. Cl.
CPC ......... *H04N 5/23222* (2013.01); *G06N 20/00* (2019.01); *H04N 5/23219* (2013.01); *H04N 5/232935* (2018.08)

(58) Field of Classification Search
CPC ......... H04N 5/23222; H04N 5/232935; H04N 5/23219; G06N 20/00
See application file for complete search history.

(56) References Cited

U.S. PATENT DOCUMENTS

| 7,805,066 | B2 | 9/2010 | Wexler et al. |
| 9,195,909 | B2 | 11/2015 | Paris et al. |
| 9,716,826 | B2 | 7/2017 | Wu et al. |
| 2011/0216218 | A1 | 9/2011 | Ogawa |
| 2017/0221244 | A1 | 8/2017 | Hiraga et al. |
| 2018/0332217 | A1 | 11/2018 | Castillo et al. |

(Continued)

OTHER PUBLICATIONS

TENSORFLOW: "Suggesting Presets for Images: Building: "For This Photo" at VSCO", Jun. 24, 2019, https://blog.tensorflow.org/2019/06/vsco-suggesting-presets-for-images.html, pp. 1-14.

(Continued)

*Primary Examiner* — Ahmed A Berhan
(74) *Attorney, Agent, or Firm* — QUALCOMM Incorporated

(57) ABSTRACT

An image capture and processing device captures an image. Based on the image and/or one or more additional images, the image capture and processing device generates and outputs guidance for optimizing image composition, image capture settings, and/or image processing settings. The guidance can be generated based on determination of a direction that a subject of the image is facing, based on sensor measurements indicating that a horizon may be skewed, another image of the same scene captured using a wide-angle lens, another image of the same subject, another image of a different subject, and/or outputs of a machine learning model trained using a set of images. The image capture and processing device can automatically apply certain aspects of the generated guidance, such as image capture settings and/or image processing settings.

35 Claims, 18 Drawing Sheets

(56) References Cited

U.S. PATENT DOCUMENTS

| | | | |
|---|---|---|---|
| 2019/0028634 A1* | 1/2019 | Koehler | H04N 5/23219 |
| 2019/0065966 A1* | 2/2019 | Vijil | G06N 20/00 |
| 2019/0174056 A1* | 6/2019 | Jung | G06N 3/084 |
| 2019/0370532 A1 | 12/2019 | Soni et al. | |
| 2020/0412937 A1* | 12/2020 | Huang | H04N 5/23225 |

OTHER PUBLICATIONS

International Search Report and Written Opinion—PCT/US2021/033263—ISA/EPO—Sep. 6, 2021.

* cited by examiner

AUTOMATIC CAMERA GUIDANCE AND SETTINGS ADJUSTMENT

CROSS-REFERENCE TO RELATED APPLICATIONS

This application claims the benefit of U.S. Provisional Application No. 63/029,214, filed May 22, 2020 and titled "Automatic Camera Guidance and Settings Adjustment," which is hereby incorporated by reference in its entirety and for all purposes.

FIELD

This application is related to image capture and image processing. More specifically, this application relates to systems and methods of automatically guiding image capture and automatically adjusting settings to visually optimize image composition and/or to apply a particular style.

BACKGROUND

In photography, certain rules or guidelines for image composition can help a photographer frame subjects within an image in a way that makes the image more visually appealing. However, many photographers are not familiar with the many different rules and guidelines for image composition, how to best apply these rules and guidelines for different types of photographs, or when to disregard certain rules and guidelines.

Cameras can apply a variety of image capture and image processing settings to alter how an image looks. Some camera settings are determined and applied before or during capture of the photograph, such as ISO, exposure time, aperture size, f/stop, shutter speed, focus, and gain. Other camera settings can configure post-processing of a photograph, such as alterations to contrast, brightness, saturation, sharpness, levels, curves, or colors. Different camera settings can emphasize different aspects of an image. However, the large number of different camera settings can be confusing for users. Users may not be aware of which settings are helpful in which scenarios, and may not understand how to tweak certain camera settings to be helpful in those scenarios.

SUMMARY

Systems and techniques are described herein for generating and outputting guidance of image capture. An image capture device captures a first image. Based on the first image, the image capture device identifies changes to properties of the image capture device. The changes cause a visual difference between the first image and a second image to be captured by the image capture device after capture of the first image. The image capture device can identify the changes based on settings for the properties under which other images than the first image were captured. For example, the other images may be images depicting the same subject as the first image depicts, or a similar subject to the subject depicted in the first image. In some examples, the changes can be based on a machine learning model trained on these other images. The image capture device generates and outputs the guidance to indicate the changes to produce the visual difference by the time the image capture device captures the second image. The properties can include positioning of the image capture device (to affect image composition), image capture settings, and/or image processing settings.

In one example, an apparatus for guiding image capture is provided. The apparatus includes one or more connectors coupled to one or more image sensors, wherein the one or more connectors receive image data from the one or more image sensors. The apparatus includes one or more memory units storing instructions and one or more processors that execute the instructions. Execution of the instructions by the one or more processors causes the one or more processors to perform a method of guiding image capture. The method includes receiving a first image of a scene captured by an image sensor. The method includes identifying a subject depicted in the first image. The method includes inputting the first image into a machine learning model, the machine learning model being trained using a plurality of training images with identified subjects. The method includes identifying, using the machine learning model, one or more changes to one or more properties associated with image capture that cause a visual difference between the first image and a second image to be captured by the image sensor after capturing the first image. The method includes outputting guidance indicative of the one or more changes to produce the visual difference before the image sensor captures the second image.

In another example, a method of guiding image capture is provided. The method includes receiving a first image of a scene captured by an image sensor of an image capture device. The method includes identifying a subject depicted in the first image. The method includes inputting the first image into a machine learning model, the machine learning model being trained using a plurality of training images with identified subjects. The method includes identifying, using the machine learning model, one or more changes to one or more properties of the image capture device that cause a visual difference between the first image and a second image to be captured by the image sensor after capturing the first image. The method includes outputting guidance indicative of the one or more changes to produce the visual difference before the image sensor captures the second image.

In another example, an non-transitory computer readable storage medium having embodied thereon a program is provided. The program is executable by a processor to perform a method of guiding image capture. The method includes receiving a first image of a scene captured by an image sensor of an image capture device. The method includes identifying a subject depicted in the first image. The method includes inputting the first image into a machine learning model, the machine learning model being trained using a plurality of training images with identified subjects. The method includes identifying, using the machine learning model, one or more changes to one or more properties of the image capture device that cause a visual difference between the first image and a second image to be captured by the image sensor after capturing the first image. The method includes outputting guidance indicative of the one or more changes to produce the visual difference before the image sensor captures the second image.

In another example, an apparatus for guiding image capture is provided. The apparatus includes means for receiving a first image of a scene captured by an image sensor of an image capture device. The apparatus includes means for identifying a subject depicted in the first image. The apparatus includes means for inputting the first image into a machine learning model, the machine learning model being trained using a plurality of training images with identified subjects. The apparatus includes means for identifying, using the machine learning model, one or more changes to one or more properties of the image capture device that cause a visual difference between the first image and a second image to be captured by the image sensor after capturing the first image. The apparatus includes means for outputting guidance indicative of the one or more changes to produce the visual difference before the image sensor captures the second image.

In some aspects, identifying the subject depicted in the first image includes performing at least one of feature detection, object detection, face detection, feature recognition, object recognition, facial recognition, and generation of a saliency map. In some aspects, the methods, apparatuses, and computer-readable medium described above further comprise: receiving the second image from the image sensor after outputting the guidance; and outputting the second image, wherein outputting the second image includes at least one of displaying the second image using a display and transmitting the second image using a transmitter.

In some aspects, identifying the one or more changes to the one or more properties of the image capture device includes identifying a movement of the image capture device from a first position to a second position, wherein outputting the guidance includes outputting an indicator for moving the image capture device from the first position to the second position. In some aspects, the second position is identified using the machine learning model. In some aspects, the indicator includes at least one of a visual indicator, an audio indicator, and a vibrational indicator. In some aspects, indicator identifies at least one of a translational direction of the movement, a translational distance of the movement, a rotational direction of the movement, and a rotational angle of the movement.

In some aspects, the indicator identifies a translational direction from the first position to the second position. In some aspects, the indicator identifies a translational distance from the first position to the second position. In some aspects, the indicator identifies a rotational direction from the first position to the second position. In some aspects, the indicator identifies a rotational angle from the first position to the second position. In some aspects, the indicator includes one or more location coordinates of the second position. In some aspects, the visual difference between the first image and the second image levels a horizon in the second image, wherein the horizon is not level as depicted in the first image.

In some aspects, the methods, apparatuses, and computer-readable medium described above further comprise: receiving pose sensor measurement data from one or more pose sensors; and determining a pose of the apparatus based on the pose sensor measurement data, wherein identifying the movement of the apparatus from the first position to a second position is based on the pose of the apparatus, wherein the pose of the apparatus includes at least one of a location of the apparatus and an orientation of the apparatus. In some aspects, the one or more pose sensors include at least one of an accelerometer, a gyroscope, a magnetometer, an inertial measurement unit, a global navigation satellite system (GNSS) receiver, and an altimeter.

In some aspects, the methods, apparatuses, and computer-readable medium described above further comprise: determining a position of the subject in the first image; and determining a direction that the subject is facing in the first image, wherein identifying the movement of the image capture device from the first position to the second position is based on the position of the subject in the first image and the direction that the subject is facing in the first image. In some aspects, determining the direction that the subject is facing in the first image is based on relative positioning of two features of the subject. In some aspects, determining the direction that the subject is facing in the first image is based on positioning of a plurality of features of the subject within the first image relative to one another. In some aspects, the subject is a person, and the plurality of features of the subject include at least one of an ear of the person, a cheek of the person, an eye of the person, an eyebrow of the person, a nose of the person, a mouth of the person, a chin of the person, and an appendage of the person.

In some aspects, determining the direction that the subject is facing in the first image is based on a movement direction in which the subject moves between the first image and a third image captured by the image sensor. In some aspects, the methods, apparatuses, and computer-readable medium described above further comprise: receiving a third image captured by the image sensor, the third image depicting the subject; and determining a direction of movement of the subject based on the position of the subject in the first image and a position of the subject in the third image, wherein determining the direction that the subject is facing in the first image is based on the direction of movement of the subject. In some aspects, the visual difference between the first image and the second image includes an increase in negative space adjacent to the subject in the direction that the subject is facing.

In some aspects, the methods, apparatuses, and computer-readable medium described above further comprise: receive a third image of the scene captured by a second image sensor, wherein the first image of the scene and the third image of the scene are captured within a time window, wherein the second image sensor has a wider field of view than the image sensor, wherein the guidance is based on a depiction of a portion of the scene in the third image that is not depicted in the first image.

In some aspects, the guidance indicates that the image capture device is to remain still between capture of the first image and capture of the second image.

In some aspects, the plurality of training images includes a training image that depicts at least one of the subject and a second subject sharing one or more similarities with the subject, wherein the one or more changes to the one or more properties indicated by the guidance are based on one or more settings for the one or more properties used for capture of the training image. In some aspects, the one or more similarities shared between the second subject and the subject include one or more saliency values associated with the second subject being within a predetermined range of one or more saliency values associated with the subject. In some aspects, the visual difference between the first image and the second image includes the second image being more similar to the training image than the first image is to the training image. In some aspects, In some aspects, the one or more changes to the one or more properties associated with image capture include applying an image capture setting before the image sensor captures the second image, wherein the image capture setting corresponds to at least one of zoom, focus, exposure time, aperture size, ISO, depth of field, analog gain, and f/stop. In some aspects, outputting the guidance includes outputting an indicator identifying the one or more changes to the one or more properties associated with image capture corresponding to applying the image capture setting. In some aspects, outputting the guidance includes automatically applying the one or more changes to the one or more properties associated with image capture corresponding to applying the image capture setting.

In some aspects, the methods, apparatuses, and computer-readable medium described above further comprise: receive the second image captured by the image sensor, wherein the one or more changes to the one or more properties associated with image capture include applying an image processing setting to the second image, wherein the image processing setting corresponds to at least one of brightness, contrast, saturation, gamma, levels, histogram, color adjustments, blur, sharpness, levels, curves, filtering, and cropping. In some aspects, outputting the guidance includes outputting an indicator identifying the one or more changes to the one or more properties associated with image capture corresponding to applying the image processing setting. In some aspects, outputting the guidance includes automatically applying the one or more changes to the one or more properties associated with image capture corresponding to applying the image processing setting.

In some aspects, the apparatus comprises a camera, a mobile device (e.g., a mobile telephone or so-called "smart phone" or other mobile device), a wireless communication device, a wearable device, a head-mounted display (HMD), an extended reality device (e.g., a virtual reality (VR) device, an augmented reality (AR) device, or a mixed reality (MR) device), a personal computer, a laptop computer, a server computer, or other device. In some aspects, the apparatus includes a camera or multiple cameras for capturing one or more images. In some aspects, the apparatus further includes the image sensor. In some aspects, the apparatus further includes one or more connectors coupled to the image sensor, wherein the one or more processors receive the first image from the image sensor through the one or more connectors. In some aspects, the apparatus further includes a display for displaying at least the second image. In some aspects, the apparatus further includes a display for displaying one or more images, notifications, and/or other displayable data.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

An image capture and processing device captures an image. Based on the image and/or one or more additional images, guidance is generated and output for optimizing image composition, image capture settings, and/or image processing settings. For instance, the guidance can be generated based on determination of a direction that a subject of the image is facing, sensor measurements indicating that a horizon may be skewed, another image of the same scene captured using a wide angle lens, another image of the same subject, another image of a different subject, and/or outputs of a machine learning model trained using a set of images. The image capture and processing device can automatically apply certain aspects of the generated guidance, such as image capture settings and/or image processing settings.

Figure 1:
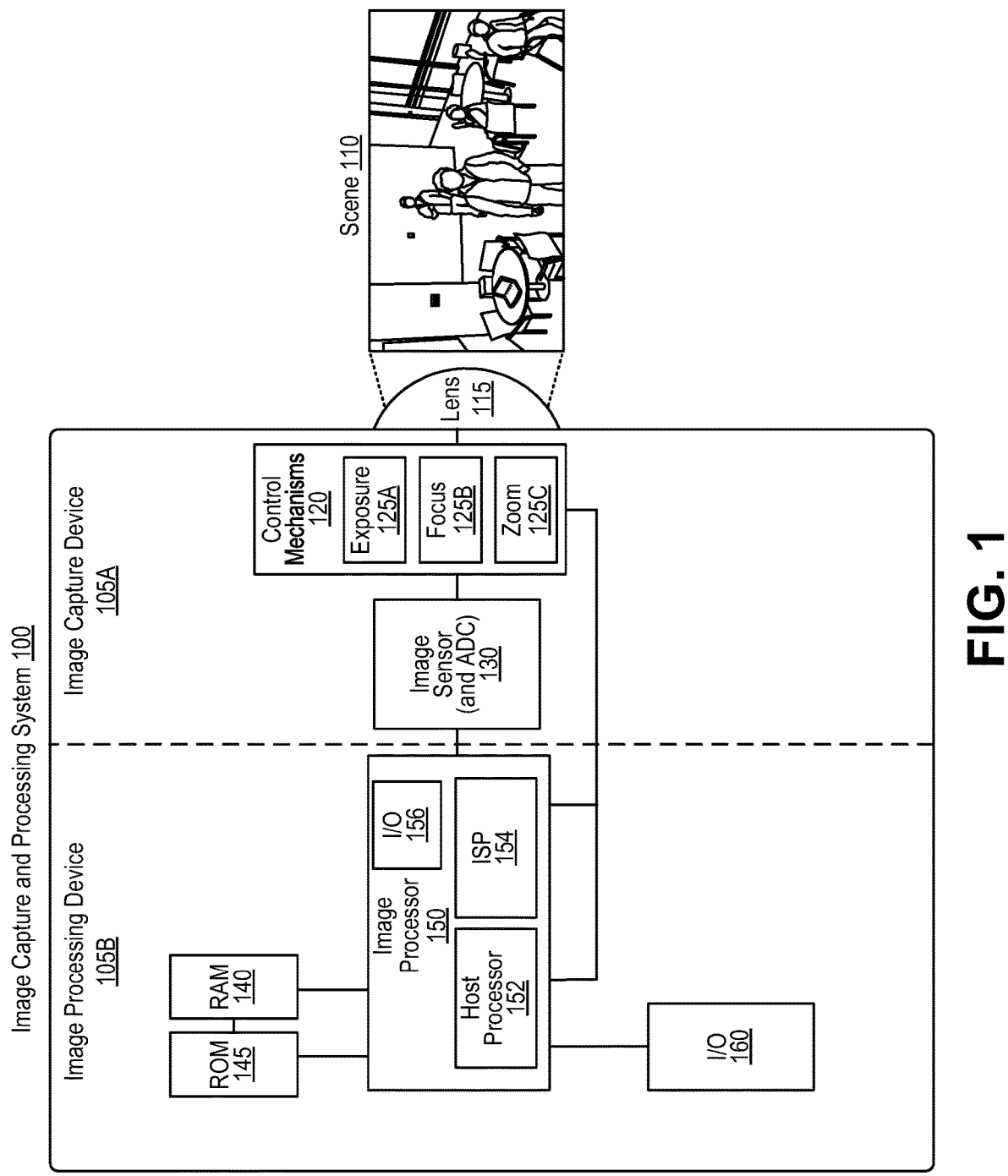
FIG. 1 is a block diagram illustrating an architecture of an image capture and processing device.

FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by an image sensor 130.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo, thereby adjusting focus. In some cases, additional lenses may be included in the system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases, vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 1810 discussed with respect to the computing device 1800. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1820, read-only memory (ROM) 145/1825, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1835, any other input devices 1845, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the system 100 and one or more peripheral devices, over which the system 100 may receive data from the one or more peripheral device and/or transmit data to the one or more peripheral devices. The I/O 160 may include one or more wireless transceivers that enable a wireless connection between the system 100 and one or more peripheral devices, over which the system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Traditional camera systems (e.g., image sensors and ISPs) are tuned with parameters and process images according to the tuned parameters. ISPs are typically tuned during production using fixed tuning methods. Camera systems (e.g., image sensors and ISP) also typically perform global image adjustment based on pre-defined conditions, such as light level, color temperature, exposure time, among others. Typical camera systems are also tuned using heuristics-based tuning with coarse precision (e.g., window based local tone mapping). As a result, traditional camera systems are not able to enhance images based on the content contained in the images.

Figure 2A:
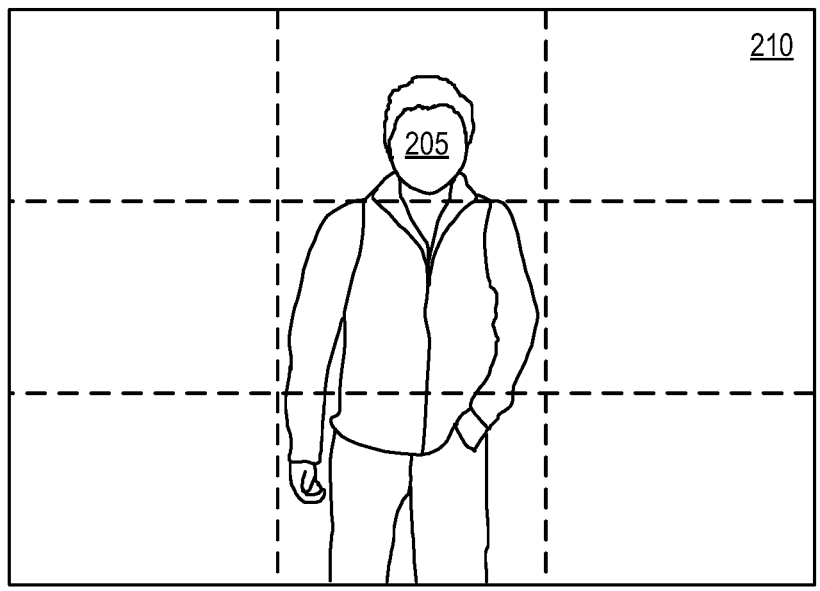
FIG. 2A is a conceptual diagram illustrating a subject centered in an image.

FIG. 2A is a conceptual diagram illustrating a subject 205 centered in an image 210. In the example image 210 of FIG. 2A, the subject 205 is a person whose face is centered horizontally in the image 210, and vertically oriented in the top third of the image 210.

Four dashed straight lines run across the image 210, separating the image 210 into nine regions of equal size. The four dashed lines include two vertical lines and two horizontal lines. The two vertical lines are parallel to one another and to the left and right sides of the image 210, and are perpendicular to the horizontal lines and to the top and bottom of the image 210. The first dashed vertical line includes one-third of the image 210 to its left and two-thirds of the image 210 to its right. The second dashed vertical line includes one-third of the image 210 to its right and two-thirds of the image 210 to its left. The two horizontal lines are parallel to one another and to the top and bottom of the image 210, and are perpendicular to the vertical lines and to the left and right sides of the image 210. The first dashed horizontal line includes one-third of the image 210 above it and two-thirds of the image 210 below it. The second dashed horizontal line includes one-third of the image 210 below it and two-thirds of the image 210 above it. These dashed lines, and the portions of the image that they represent, may be referred to as guide lines, thirds lines, grid lines, or some combination thereof.

The rule of thirds is an image composition rule or guideline indicating that aligning a subject along one of these thirds lines, or to an intersection of two of these thirds lines, is more visually interesting and creates more tension, energy, and interest than simply aligning the subject in the center of the image or other positions of the subject in the image. In FIG. 2A, the subject 205—the face of the person—is between the two vertical thirds lines, and above the top horizontal thirds line, which is sub-optimal according to the rule of thirds.

Figure 2B:
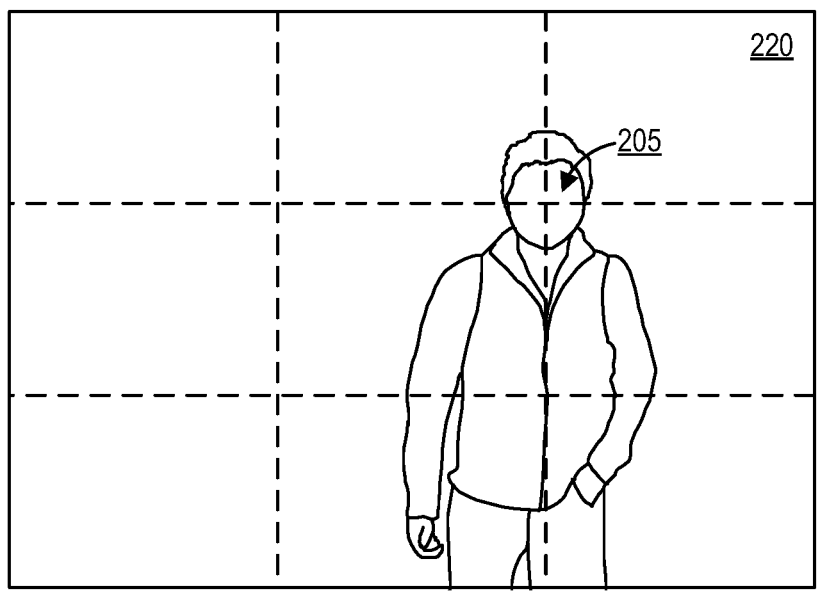
FIG. 2B is a conceptual diagram illustrating the subject of FIG. 2A aligned to two lines representing thirds of the image.

FIG. 2B is a conceptual diagram illustrating the subject 205 of FIG. 2A aligned to two lines representing thirds of the image 220. Specifically, the dashed thirds lines of FIG. 2A are also illustrated in FIG. 2B, and the subject 205—the face of the person—is centered on an intersection of the right vertical thirds line and the top horizontal thirds line. Based on the rule of thirds, then, the image 220 of FIG. 2B has better image composition than the image 210 of FIG. 2B.

Some images have multiple subjects. Because there are four thirds lines, and four intersections of thirds lines, image composition in images with multiple subjects can be improved by aligning each of the subjects to at least one of these four thirds lines, and/or to at least one of these four thirds line intersections. In some cases in which an image depicts multiple subjects, image composition may be improved by aligning at least a subset of the subjects with at least one of these four thirds lines, and/or to at least one of these four thirds line intersections. For example, a most prominent subject may be selected to be aligned with at least one of these four thirds lines, and/or to at least one of these four thirds line intersections.

Figure 3A:
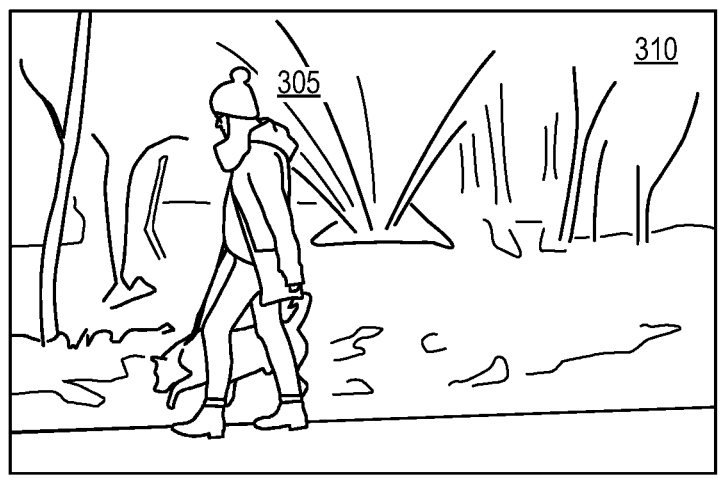
FIG. 3A is a conceptual diagram illustrating a left-moving subject depicted on the left-hand side of an image.

FIG. 3A is a conceptual diagram illustrating a left-moving subject 305 depicted on the left-hand side of an image 310. In the example image 310 of FIG. 3A, the subject 305 is a person walking a dog. The subject 305 is facing left and walking to the left.

Another rule or guideline for image composition indicates that negative space should be left in front of a subject that is facing a particular direction, especially if the subject is moving in that direction. A viewer's eyes are drawn to look where a subject is looking at and/or moving toward. Including negative space in front of the subject in an image allows a viewer to see more of the space that the subject is looking at and/or moving toward, making more of the image interesting to the viewer. On the other hand, failing to include much negative space in front of the subject in an image causes a viewer's gaze to end abruptly when looking in front of the subject, and instead includes more of the area behind the subject, which is less visually interesting than the area in front of the subject.

In FIG. 3A, the subject 305 is facing left and walking to the left, and is on the left-hand side of an image 310, appearing to be aligned with the left vertical third line in the image 310. Despite following the rule of thirds, however, the image composition of the image 310 is not very good, as very little negative space is included in front of the subject 305 in the image 310, and a lot of space is instead included behind the subject 305 in the image 310.

Figure 3B:
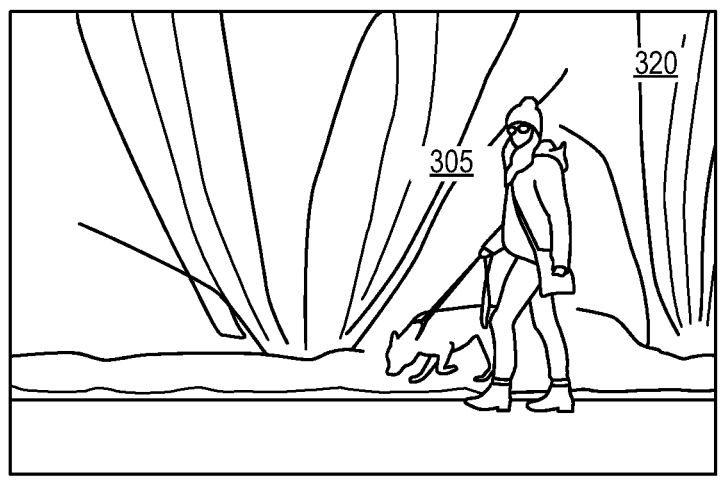
FIG. 3B is a conceptual diagram illustrating the left-moving subject of FIG. 2A depicted on the right-hand side of an image.

FIG. 3B is a conceptual diagram illustrating the left-moving subject 305 of FIG. 2A depicted on the right-hand side of an image 320. The subject 305 is still facing left and walking to the left in the image 320, but is now aligned to the right vertical third line in the image 320. Thus, the image 320 includes more negative space in front of the subject 305 than the image 310, meaning that the image 320 has better image composition than the image 310 with respect to negative space.

The rule of thirds demonstrated in FIGS. 2A-3B and the rule of negative space demonstrated in FIGS. 3A-3B are just two of many rules or guidelines for image composition can help a photographer frame subjects within an image in a way that makes the image more visually appealing. Another image composition rule or guideline indicates image composition is improved when lines in an image, whether straight or curved, are "leading" lines that lead a viewer toward subject(s) of the image. These lines can be roads, rails, coastlines, rivers, converging buildings, a line of trees, a row of clouds, a row of birds or people or other living beings, a line of cars, a person's limbs, other types of lines, or combinations thereof. Another image composition rule or guideline indicates that image composition is improved when an image exhibits symmetry with matching or similar elements, whether the symmetry is vertical, horizontal, radial, or otherwise. Symmetry provides balance to a scene and may be achieved by providing two subjects on opposite ends of an image, for instance. On the other hand, intentional asymmetry may also improve image composition if it also provides balance to an image. Asymmetrical balance may be achieved via tonal balance (dark vs. light), color balance (bold/bright vs. subtle/neutral), size balance (big vs. small), texture balance (highly textured vs. smooth), space balance (viewer eye direction or subject movement into space vs. into the edge of the frame), abstract balance (contrasting two ideas, such as nature vs. industry, old vs new, happy vs. sad, etc.), or some combination thereof.

Another image composition rule or guideline indicates that image composition is improved by inclusion of patterns, which suggest harmony. Patterns may include a row of columns, books on a shelf, a line of people, bricks in a brick wall, petals on a flower, waves rolling to the beach, and other patterns. Another image composition rule or guideline indicates that image composition is improved by filling as much of the frame (the boundaries) of the image with the subject or subjects of the image as possible so that the subject of the image is clear. Filling the frame can be achieved when the image capture device 105A is close to the subject, when the image capture device 105A uses a zoom lens to zoom in on the subject, or when the image processing device 105B crops the image after capture to remove space from the image that is not occupied by one or more subjects. Filling the frame improves image composition especially when the area around the subject(s) is busy or otherwise distracting. Conversely, providing negative space around the subject(s) when the area around the subject(s) is simple (e.g., a blue sky) instead of busy or distracting can also help draw the viewer's eye toward the subject(s) and thus improve image composition. As discussed above with respect to FIGS. 3A-3B, negative space can be useful to include when a subject is facing or moving within the image.

Another image composition rule or guideline indicates that image composition is improved by including multiple layers of depth in the scene, with subjects (e.g., living things, objects, or other interesting visual elements that are a focal point in the image) in the foreground of the image, in the background of the image, and in one or more layers in between. A related image composition rule or guideline indicates that image composition is improved through use of depth of field to ensure that subject(s) of the image are sharp, while less important areas are blurred due to depth of field. For instance, a shallow (narrow) depth of field can provide improved image composition for portrait images, and make the subject clear and sharp in the image while anything in the background of the subject (behind the subject and farther from the image capture device 105A) and/or in the foreground of the subject (in front of the subject and closer to the image capture device 105A) appears more blurry than the subject. On the other hand, a deep (wide) depth of field can provide improved image composition for landscape images, and generally allow most of the image to be sharp. Image composition is also improved by otherwise reducing distractions, even if not through depth of field, for instance by blurring a background relative to a subject, darkening a background relative to a subject, or brightening a background relative to a subject.

Another image composition rule or guideline indicates that image composition is improved by framing subjects with visual elements that are also included in the image. For instance, image composition is improved if a subject of an image is visually framed by one or more archways, doorways, openings, bridges, trees, tree branches, caves, mountains, walls, arms, limbs, or some combination thereof. Another image composition rule or guideline indicates that image composition is improved by including diagonal lines and/or triangles in the image, which can provide tension and/or a more natural feel to images, which are often captured and/or stored in square or rectangular shapes. Another image composition rule or guideline indicates that unusual viewpoints on familiar subjects can improve image composition by making resulting images more interesting. For instance, a portrait of a person or group of people may be more visually interesting if captures from a bird's-eye view above the person or group, or from a worm's-eye view below the person or group, rather than simply straight ahead at the person or group's eye level. Another image composition rule or guideline indicates that image composition is improved if moving subject move a left side of the image to a right side of the image, as most viewers read from left to right. Image composition can also be improved if an image includes an odd number of subjects or visual elements.

The sheer number of different image composition rules and guidelines can cause image composition rules and guidelines to be confusing and difficult for new photographers to learn and even for professional photographers to keep track of Thus, an image capture device 105A and/or image processing device 105B that provides guidance to users to improve image composition and/or that can automatically adjust settings to improve image composition will produce superior images with superior image composition to image capture devices 105A and/or image processing devices 105B that do not provide such guidance.

Figure 4:
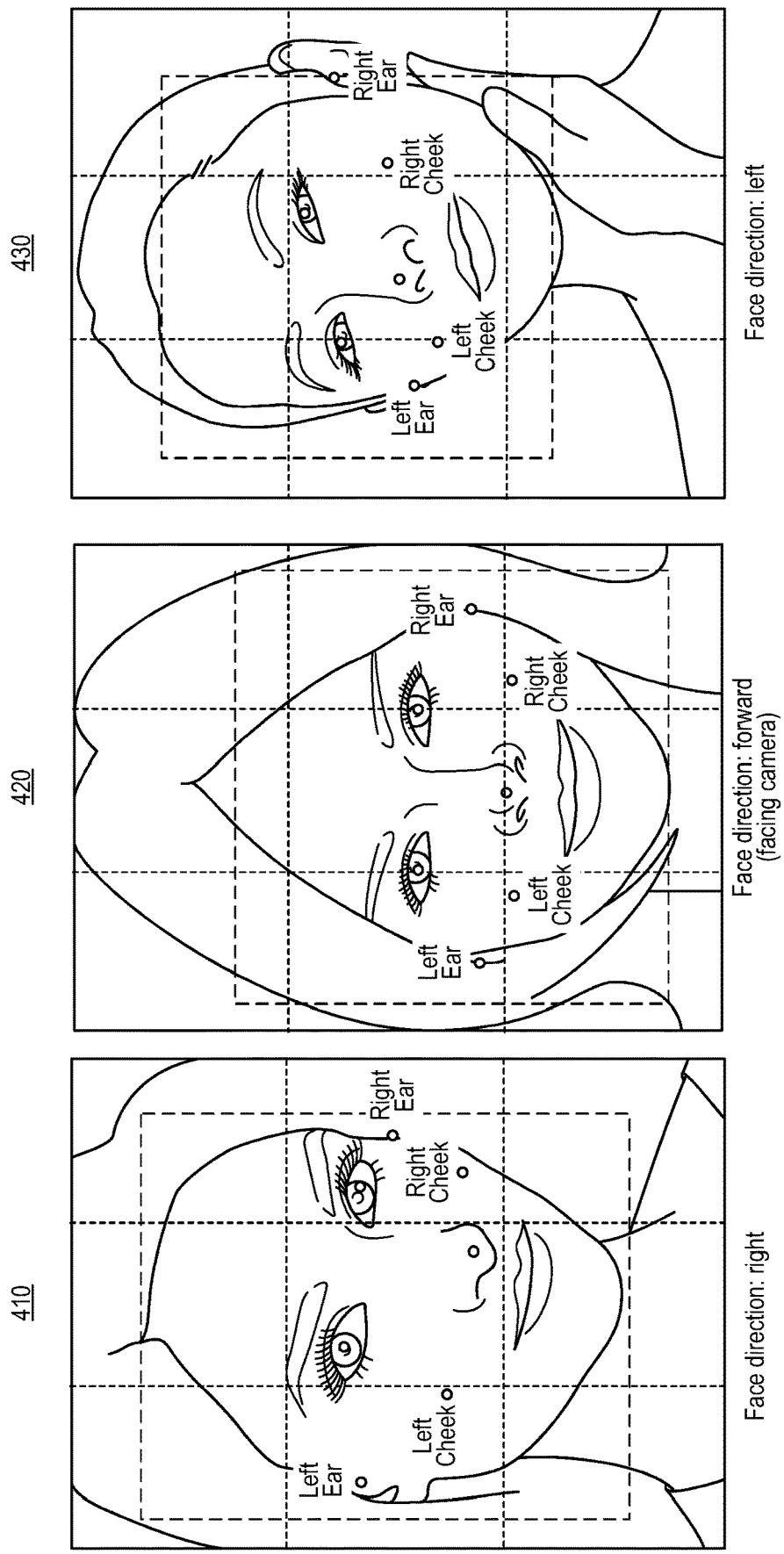
FIG. 4 is a conceptual diagram illustrating three images of human faces with markings on certain features that can be used to determine a direction that the human faces are facing.

FIG. 4 is a conceptual diagram illustrating three images of human faces with markings on certain features that can be used to determine a direction that the human faces are facing. The first image 410 of FIG. 4 illustrates a person's face that is facing the right side of the image. The second image 420 of FIG. 4 illustrates a person's face that is facing forward in the image, toward the image capture device 105A that captured the second image 420. The third image 430 of FIG. 4 illustrates a person's face that is facing the left side of the image.

Several facial features are labeled in the three images 410, 420, and 430. Specifically, all eyes, ears, cheeks, and noses are recognized and marked with white circle indicators and/or labels in the three images 410, 420, and 430. Other facial features that may be detected but are not marked in the images 410, 420, and 430 of FIG. 4 include moths, chins, eyebrows, and nostrils. The image processing device 105B, upon receiving an image from the image sensor, can detect any combination of these features using feature detection algorithms. A feature detection algorithm may include feature detection, object detection, facial detection, landmark detection, edge detection, feature recognition, object recognition, facial recognition, landmark recognition, image classification, computer vision, or some combination thereof.

Once the image processing device 105B receives an image from the image sensor and detects these features, the image processing device 105B can determine which direction a subject is facing based on these features. This may be done by comparing a distance between two features that are on the left side of a subject (e.g., the left side of a person's face) in the image to a distance between two features that are on the right side of a subject (e.g., the right side of a person's face) in the image. For instance, a "left distance" between a subject's left cheek and the subject's left ear may be compared to a "right distance" between the subject's right cheek and the subject's right ear.

If the image processing device 105B receives an image and determines that the left distance and the right distance for a subject of the image are equal to one another, or within a threshold of one another, then the image processing device 105B determines that the subject is facing the forward as in the second image 420. If the image processing device 105B receives an image and determines that the left distance exceeds the right distance for a subject of the image by at least a threshold amount, then the image processing device 105B determines that the subject is facing the right as in the first image 410. If the image processing device 105B receives an image and determines that the right distance exceeds the left distance for a subject of the image by at least a threshold amount, then the image processing device 105B determines that the subject is facing the left as in the third image 430. The left distance and right distance may also be calculated as a distance from a left-side or right-side feature, respectively, to a central feature, such as a person's nose, mouth, or chin. For instance, the left distance may be a distance from the tip of the subject's nose to the subject's left eye, while the right distance is a distance from the tip of the subject's nose to the subject's right eye. Different features may be used depending on which features are most clearly visible in the subject. For instance, if a subject has long hair that cover's the subject's ears, the subject's eyes or cheeks may be used in place of the subject's ears as features for calculating the left and right distance values. On the other hand, if certain features are not visible, this may also be used to determine a direction in which the subject is facing. For instance, if the image processing device 105B detects a subject's left ear in the image but cannot detect the subject's right ear in the image, the image processing device 105B can determine that the subject is facing right because the subject's right ear is hidden behind the subject. Similarly, if the image processing device 105B detects a subject's right ear in the image but cannot detect the subject's left ear in the image, the image processing device 105B can determine that the subject is facing left because the subject's left ear is hidden behind the subject.

Note that, as discussed herein, the left side of the subject means the side of the subject closest to the left side of the image and/or on the left side of the subject as depicted in the image, and the right side of the subject means the side of the subject closest to the right side of the image and/or on the right side of the subject as depicted in the image. Because of this, a subject's left ear or left eye or left cheek as discussed herein may, in some cases, be what the subject himself/herself might consider his/her right ear or right eye or right cheek, and vice versa. Because of this, it should be understood that these directions may be reversed in order to discuss the directions from the perspective of the subject rather than from the perspective of the captured image.

The feature detection and/or recognition algorithm can be performed using any suitable feature recognition and/or detection technique. In some implementations, the feature detection and/or recognition algorithm applied by the image processing device 105B may include and/or incorporate an image detection and/or recognition algorithm, an object detection and/or recognition algorithm, a facial detection and/or recognition algorithm, a feature detection and/or recognition algorithm, a landmark detection and/or recognition algorithm, an edge detection algorithm, a boundary tracing function, or some combination thereof. Feature detection is a technology used to detect (or locate) features of objects from an image or video frame. Detected features or objects can be represented using bounding regions that identify the location and/or approximate boundaries of the object (e.g., a face) in the image or video frame. A bounding region of a detected object can include a bounding box, a bounding circle, a bounding ellipse, a bounding polygon, or any other suitably-shaped region representing and/or including a detected object. Object detection and/or recognition can be used to identify a detected object and/or to recognize and classify the detected object into a category or type of object. For instance, feature recognition may identify a number of edges and corners in an area of the scene. Object detection may detect that the detected edges and corners in the area all belong to a single object. Object detection and/or object recognition and/or face detection may identify that the object is a human face. Object recognition and/or face recognition may further identify the identity of the person corresponding to that face.

In some implementations, the feature detection and/or recognition algorithm can be performed using any suitable feature recognition and/or detection technique. In some implementations, the feature detection and/or recognition algorithm can be based on a machine learning model trained using a machine learning algorithm on images of the same types of objects and/or features that may extract features of the image and detect and/or classify the object comprising those features based on the training of the model by the algorithm. For instance, the machine learning algorithm may be a neural network (NN), such as a convolutional neural network (CNN), a time delay neural network (TDNN), a deep feed forward neural network (DFFNN), a recurrent neural network (RNN), an auto encoder (AE), a variation AE (VAE), a denoising AE (DAE), a sparse AE (SAE), a Markov chain (MC), a perceptron, or some combination thereof. The machine learning algorithm may be a supervised learning algorithm, a deep learning algorithm, or some combination thereof.

In some implementations, a computer vision-based feature detection and/or recognition technique can be used. Different types of computer vision-based object detection algorithms can be used. In one illustrative example, a template matching-based technique can be used to detect one or more hands in an image. Various types of template matching algorithms can be used. One example of a template matching algorithm can perform Haar or Haar-like feature extraction, integral image generation, Adaboost training, and cascaded classifiers. Such an object detection technique performs detection by applying a sliding window (e.g., having a rectangular, circular, triangular, or other shape) across an image. An integral image may be computed to be an image representation evaluating particular regional features, for example rectangular or circular features, from an image. For each current window, the Haar features of the current window can be computed from the integral image noted above, which can be computed before computing the Haar features.

The Harr features can be computed by calculating sums of image pixels within particular feature regions of the object image, such as those of the integral image. In faces, for example, a region with an eye is typically darker than a region with a nose bridge or cheeks. The Haar features can be selected by a learning algorithm (e.g., an Adaboost learning algorithm) that selects the best features and/or trains classifiers that use them, and can be used to classify a window as a face (or other object) window or a non-face window effectively with a cascaded classifier. A cascaded classifier includes multiple classifiers combined in a cascade, which allows background regions of the image to be quickly discarded while performing more computation on object-like regions. Using a face as an example of a body part of an external observer, the cascaded classifier can classify a current window into a face category or a non-face category. If one classifier classifies a window as a non-face category, the window is discarded. Otherwise, if one classifier classifies a window as a face category, a next classifier in the cascaded arrangement will be used to test again. Until all the classifiers determine the current window is a face (or other object), the window will be labeled as a candidate for being a hand (or other object). After all the windows are detected, a non-max suppression algorithm can be used to group the windows around each face to generate the final result of one or more detected faces.

Figure 5:
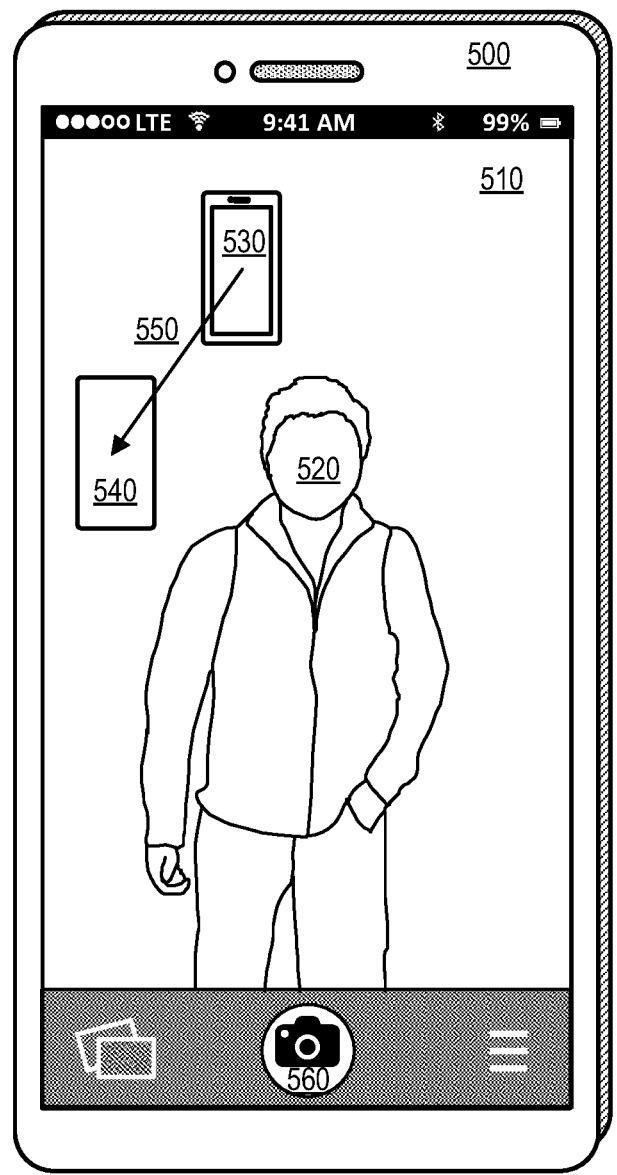
FIG. 5 is a conceptual diagram illustrating a user interface of an image capture device with a positioning guidance indicator guiding a user to move the image capture device a particular distance in a particular direction.

FIG. 5 is a conceptual diagram illustrating a user interface 510 of an image capture device 500 with a positioning guidance indicator guiding a user to move the image capture device 500 a particular distance in a particular direction. The user interface 510 of FIG. 5 is an image capture user interface, and shows a preview image of the image most recently received from an image sensor 130 of the image capture device 500, at least until the user of the image capture device 500 presses a shutter button 560 to capture an image. The image capture device 500 of FIG. 5 may include an image capture device 105A, an image processing device 105B, an image capture and processing system 100, a computing device 1800, or some combination thereof.

The preview image displayed by the user interface 510 is an image with a subject 520. The subject 520 is a person, with the face of the person aligned to the center of the preview image. Because the face of the person is aligned to the center of the preview image, moving the image capture device 500 to align the subject 520—the face of the person—to one or more third lines of the preview image would improve image composition based on the rule of thirds. The image processing device 105B of the image capture device 500 identifies the subject 520 and identifies, for instance, the closest intersection of thirds lines to the subject 520, and generates and outputs a positioning guidance indicator guiding the user of the image capture device 500 to move the image capture device 500 to align the subject 520 to that intersection of third lines. In the user interface 510 of FIG. 5, the positioning guidance indicator is a visual indicator illustrated as a small icon 530 representing the image capture device 500, an arrow 550 from the icon 530 indicating a direction to move the image capture device 500, and a goal rectangle 540 at the other end of the arrow 550 representing where the movement of the image capture device 500 should stop. The movement may be a translational movement (as opposed to a rotational movement), and the direction may thus be a translational direction. In some cases, the movement may include a rotational, and the direction may include a rotational direction. The arrow in the user interface 510 points down and to the left, indicating that the user should move the image capture device 500 down and to the left. As the user moves the image capture device 500 down and to the left in the direction the arrow 550 is pointing, the icon 530 can move along the arrow toward the goal rectangle 540 until the icon 530 reaches the goal rectangle. In this way, the direction of the arrow 550 and the direction of the goal rectangle 540 relative to the icon 530 indicates the direction that the image processing device 150B of the image capture device 500 guides the user to move the image capture device 500. The length of the arrow 550 and the distance between the goal rectangle 540 and the icon 530 show a representation of a distance that the image processing device 150B of the photograph device 500 guides the user to move the photograph device 500 in the direction. In some cases, either the arrow 550 or goal rectangle 540 may be omitted. Alternate interfaces may be used, for instance audio interfaces telling the user to move the image capture device a certain direction and/or a certain distance in that direction. Tactile interface elements may be used as well. For instance, the image processing device 150B of the photograph device 500 may actuate one or more motors to vibrate the image capture device 500 once the image capture device 500 reaches the correct location. Alternately, the image processing device 150B of the photograph device 500 may actuate one or more motors to vibrate the image capture device 500 until the image capture device 500 reaches the correct location.

While the image 510 includes a single subject 520—the face of the person—some images may include more than one subject. For example, an image may depict multiple people, pets, documents, and display screens, all of which may be detected by the image capture device 500 and determined by the image capture device 500 to be subjects depicted within the image. In some cases in which an image depicts multiple subjects, image composition may be improved by aligning at least a subset of the subjects with at least one of these four thirds lines, and/or to at least one of these four thirds line intersections. In some examples, the image capture device 500 may select a subset of the subjects depicted in the image to be selected subjects. The image capture device 500 may output a guidance, such as the small icon 530 guided to the goal rectangle 540 along the arrow 550 depicted in FIG. 5, that guides movement of the image capture device 500 so that each of the selected subjects is aligned with at least one of the four thirds lines, and/or to at least one of the four thirds line intersections. For example, the one or more selected subjects may be selected to include the one or more most prominent subject(s) of all of the subjects depicted in the image. The image capture device 500 may identify the most prominent subject(s) by generating a saliency map of the image, and selecting the one or more subjects corresponding to the highest saliency regions of the image. The image capture device 500 may identify the most prominent subject(s) by detecting which subject(s) are most in the foreground of the image (closest to the image capture device 500 during capture), for example based on depth sensor information and/or based on size as depicted in the image, and selecting the subject(s) that are most in the foreground of the image to be the selected subjects. The image capture device 500 may select the subject(s) that are depicted largest in the image to be the selected subjects. The image capture device 500 may receive one or more user inputs identifying a subject, for example the by the user touching, clicking on, gesturing around, or otherwise selecting one or more subjects depicted in a preview image, and may select the selected subjects based on the subjects identifying by the user inputs. In some cases, the image capture device 500 may select the selected subject(s) based on a combination of the above-listed selection techniques.

Figure 6:
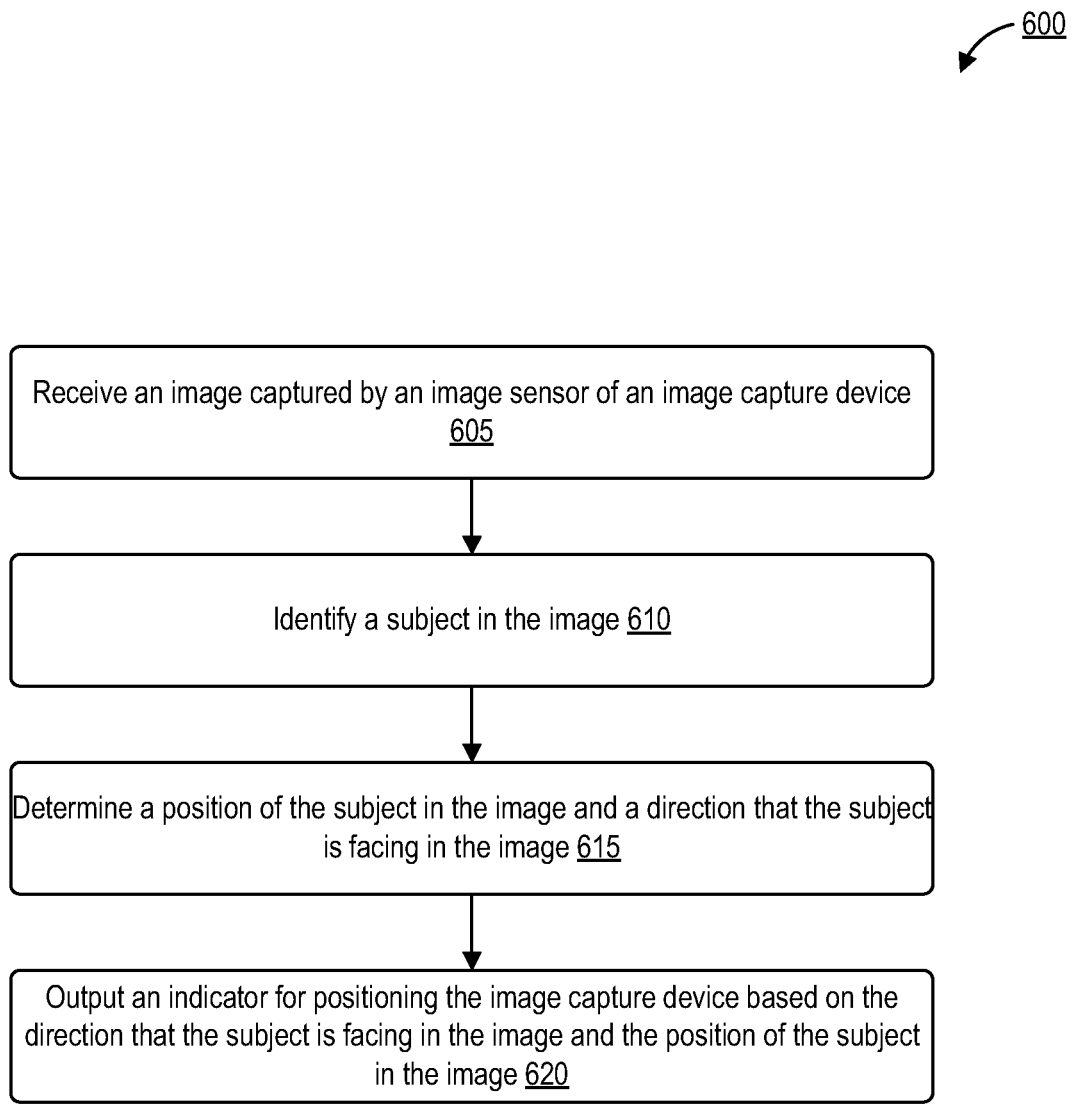
FIG. 6 is a flow diagram illustrating operations for guiding image capture based on a direction that a subject is facing in the image.

FIG. 6 is a flow diagram illustrating operations 600 for guiding image capture based on a direction that a subject is facing in the image. Though an image capture device 105A is referenced in the operations 600, the operations 600 may be performed by a variety of devices, which may include an image capture device 105A, an image processing device 105B, an image capture and processing system 100, an image capture device 500/700/900/1100/1300/1500, one or more network servers of a cloud service, a computing device 1800, or some combination thereof.

At operation 605, the device receives an image captured by an image sensor 130 of an image capture device 150A. The term "capture," as used herein, may refer to temporary storage (e.g., in a temporary image buffer of the device), longer-term storage in non-transitory computer-readable storage medium, or some combination thereof. At operation 610, the device identifies a subject in the image, for example using object detection, feature detection, facial detection, or one of the other image detection or recognition techniques discussed herein.

At operation 615, the device determines a position of the subject in the image and a direction that the subject is facing in the image. Determining a direction that the subject is facing in the image may be based on positioning of a plurality of features of the subject within the image relative to one another. As discussed with respect to FIG. 4, the device may identify two features along the left side and/or center of the subject in the image and determine a left distance between these two features. The device may identify two features along the right side and/or center of the subject in the image and determine a right distance between these two features. The device may determine the direction that the subject is facing in the image by comparing the left distance to the right distance. If the left distance is equal to or within a threshold of the right distance, the subject is facing forward. If the left distance exceeds the right distance by at least a threshold, the subject is facing right. If the right distance exceeds the left distance by at least a threshold, the subject is facing left. If the subject is or includes a person, the features may include, for example, an ear, a cheek, an eye, an eyebrow, a nose, a mouth, a chin, a chest, a belly, a back, a rear, a leg, an arm, a shoulder, an elbow, a knee, an ankle, a hand, a foot, another appendage, or portion thereof, or some combination thereof.

In some cases, determining a direction that the subject is facing in the image may be based on receiving an additional image also captured by the image sensor 130, where the device determines a direction of movement of the subject based on the image and the second image, and determines the direction that the subject is facing is the direction of movement of the subject. For instance, if the additional image is captured after the image, and the subject appears further to the left in the additional image than in the image, then the device determines that the subject is moving to the left and therefore facing to the left. Alternately, if the additional image is captured before the image, and the subject appears further to the left in the additional image than in the image, then the device determines that the subject is moving to the right and therefore facing to the right.

At operation 620, the device generates and outputs an indicator for positioning the image capture device based on the direction that the subject is facing in the image and a position of the subject in the image. The indicator may identify a direction in which the device is to be moved in order to improve framing of the subject in a second image to be captured after the image capture device is moved. The indicator may include at least one of a visual indicator, an audio indicator, or a vibrational indicator. For instance, the visual indicator may look similar to the visual indicators 530/540/550 of FIG. 5.

In some cases, the device may identify that the image capture device has been moved in the direction and may receive the second image captured by the image sensor 130 after identifying that the image capture device has been moved in the direction, the image sensor 130 having captured the second image. In some cases, outputting the guidance for positioning the image capture device includes outputting an indicator at the image capture device indicating that the image capture device is to remain still between capture of the first image and capture of the second image.

Figure 7A:
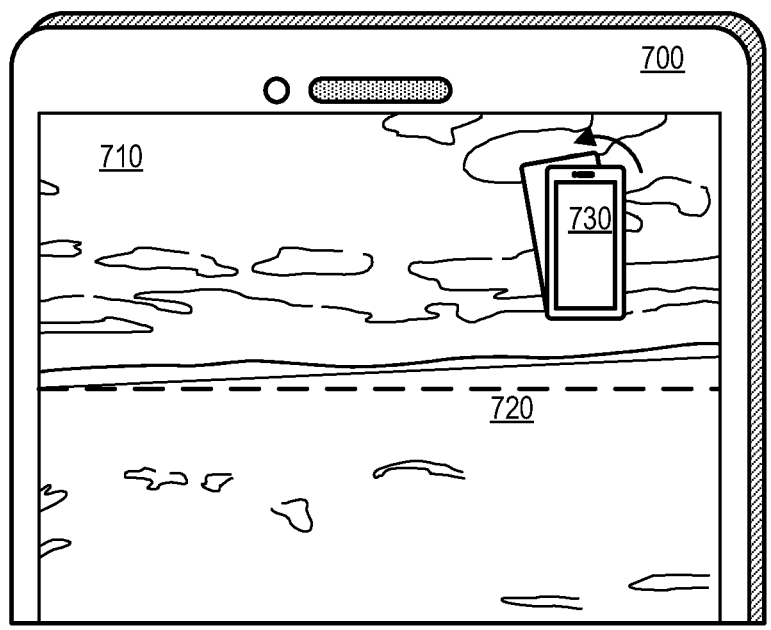
FIG. 7A is a conceptual diagram illustrating a user interface of an image capture device with a positioning guidance indicator guiding a user to tilt the image capture device counter-clockwise in order to level a horizon in an image.

FIG. 7A is a conceptual diagram illustrating a user interface of an image capture device 700 with a positioning guidance indicator 730 guiding a user to tilt the image capture device counter-clockwise in order to level a horizon in an image. The user interface of FIG. 7A is an image capture user interface, and shows a preview image 710 of the image most recently received from an image sensor 130 of the image capture device 700. The image capture device 700 of FIGS. 7A-7B may include an image capture device 105A, an image processing device 105B, an image capture and processing system 100, a computing device 1800, or some combination thereof.

The preview image 710 illustrated in the UI of FIG. 7A includes a horizon, which is not level. In other words, the horizon is not horizontal, and may for instance be more than a threshold angle away from being horizontal. The UI of FIG. 7A includes a dashed horizontal line 720 for reference, so that it is more clearly visible that the horizon in the image 710 is not horizontal. The image capture device 700 of FIG. 7A may detect that the image capture device 700 is tilted, for instance using an accelerometer, gyroscope, magnetometer, or inertial measurement unit (IMU) of the photograph device 700. The image capture device 700 generates a positioning guidance indicator 730 with an icon representing the image capture device 700, an arrow showing that the image capture device 700 is to be rotated counter-clockwise, and a guidance square counter-clockwise of the image capture device 700 representing the position that the image capture device 700 is to be in to level the horizon.

Figure 7B:
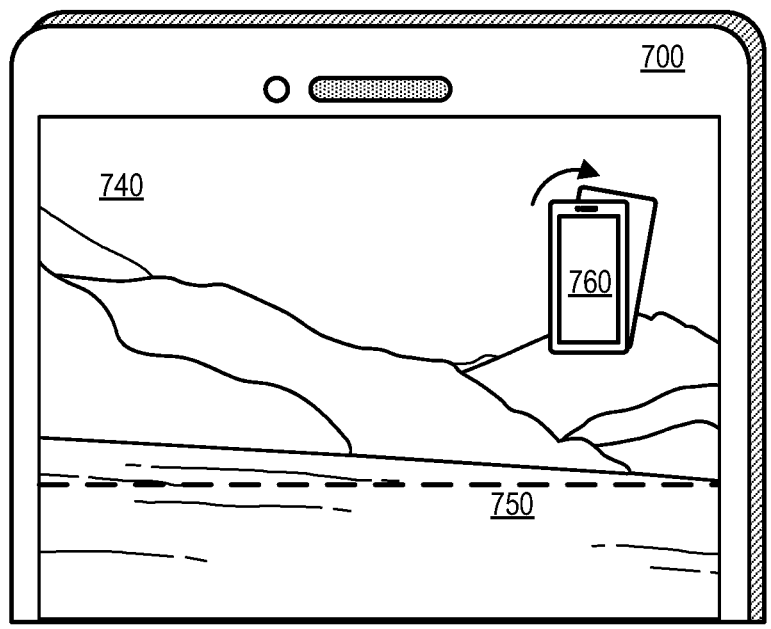
FIG. 7B is a conceptual diagram illustrating a user interface of an image capture device with a positioning guidance indicator guiding a user to tilt the image capture device clockwise in order to level a horizon in an image.

FIG. 7B is a conceptual diagram illustrating a user interface of an image capture device 700 with a positioning guidance indicator 760 guiding a user to tilt the image capture device clockwise in order to level a horizon in an image. The user interface of FIG. 7B is an image capture user interface, and shows a preview image 740 of the image most recently received from an image sensor 130 of image capture device 700. The preview image 740 illustrated in the UI of FIG. 7B includes a horizon, which is not level. The UI of FIG. 7B includes a dashed horizontal line 750 for reference, so that it is more clearly visible that the horizon in the image 740 is not horizontal. The image capture device 700 of FIG. 7B may detect that the image capture device 700 is tilted, for instance using an accelerometer, gyroscope, magnetometer, or IMU of the photograph device 700. The image capture device 700 generates a positioning guidance indicator 760 with an icon representing the image capture device 700, an arrow showing that the image capture device 700 is to be rotated counter-clockwise, and a guidance square counter-clockwise of the image capture device 700 representing the position that the image capture device 700 is to be in to level the horizon.

Figure 8:
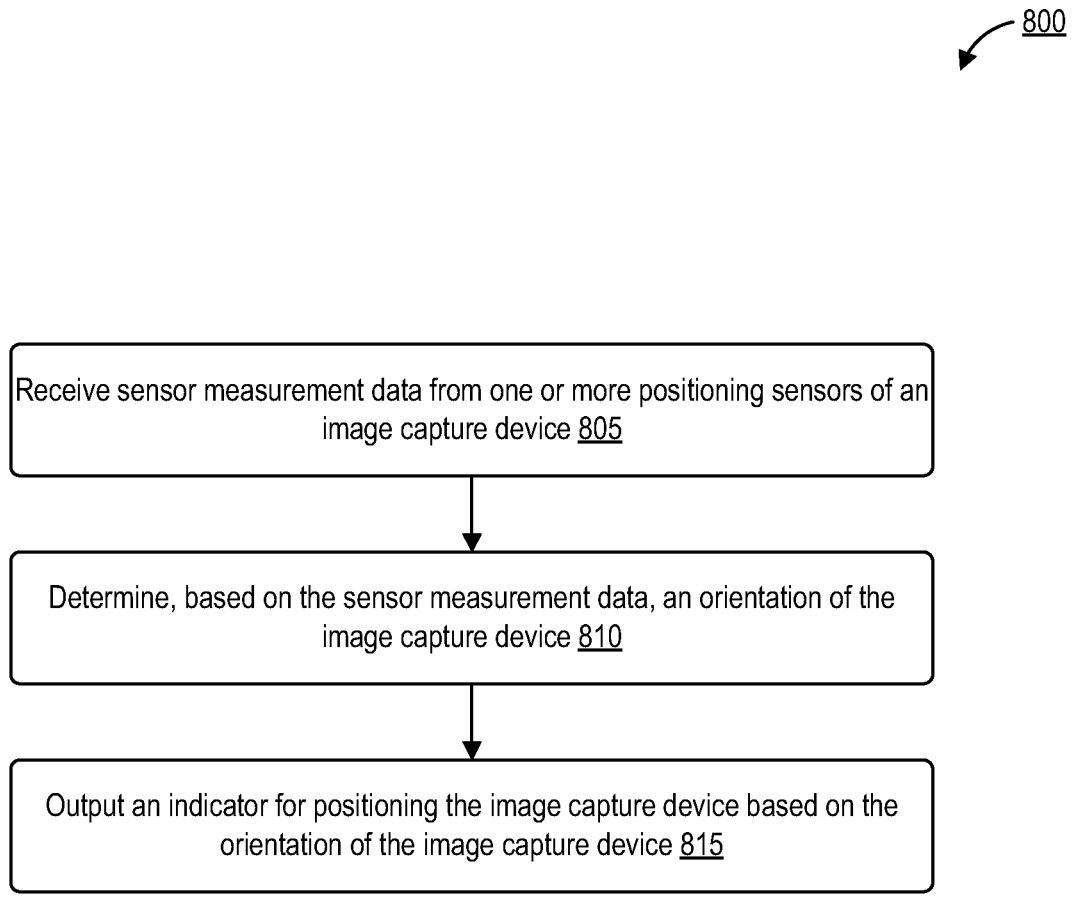
FIG. 8 is a flow diagram illustrating operations for guiding image capture based on sensor measurement data from one or more positioning sensors of an image capture device.

FIG. 8 is a flow diagram illustrating operations 800 for guiding image capture based on sensor measurement data from one or more positioning sensors of an image capture device 105A. Though an image capture device 105A is referenced in the operations 800, the operations 800 may be performed by a variety of devices, which may include an image capture device 105A, an image processing device 105B, an image capture and processing system 100, an image capture device 500/700/900/1100/1300/1500, one or more network servers of a cloud service, a computing device 1800, or some combination thereof.

At operation 805, the device receives sensor measurement data from one or more positioning sensors of an image capture device 105A. The one or more positioning sensors may include at least one of an accelerometer, a gyroscope, a magnetometer, an inertial measurement unit, a global navigation satellite system (GNSS) receiver, or an altimeter.

At operation 810, the device determines, based on the sensor measurement data, an orientation of the image capture device 105A. At operation 815, the device generates and outputs an indicator for positioning the image capture device 105A based on the orientation of the image capture device 105A. In some cases, the indicator identifies a direction in which the image capture device 105A is to be tilted in order to level a horizon in an image to be captured after the image capture device 105A is tilted. Tilting, in this case, refers to rotation of the image capture device 105A about one or more axes. The axes may include, for example an axis that is perpendicular to a front and/or rear surface of the image capture device 105A, that is that is perpendicular to a display screen surface of the image capture device 105A, that is perpendicular to a surface the image sensor of the image capture device 105A, that is that is perpendicular to a surface of a lens of the image capture device 105A, or some combination thereof. The indicator includes at least one of a visual indicator, an audio indicator, and a vibrational indicator. A visual indicator may include any of the elements of the indicators 730 and 760 of FIGS. 7A-7B, for example. In some cases, the indicator also identifies an angle that the image capture device 105A is to be tilted in the direction in order to improve framing of the subject in the image. Tilting may be referred to as a rotational movement. The direction of tilting may be referred to as a rotational direction. The angle of tilting may be referred to as a rotational angle. The rotational movement may, in some cases, be paired with a translational movement.

In some cases, the device further identifies that the device has been tilted in the direction, receiving the image from an image sensor 130 of the image capture device 105A after identifying that the image capture device 105A has been tilted in the direction, the image sensor 130 having captured the image. In some cases, outputting the guidance for positioning the image capture device 105A includes outputting an indicator at the image capture device indicating that the image capture device is to remain still (e.g., between capture of the first image and capture of the second image).

Figure 9:
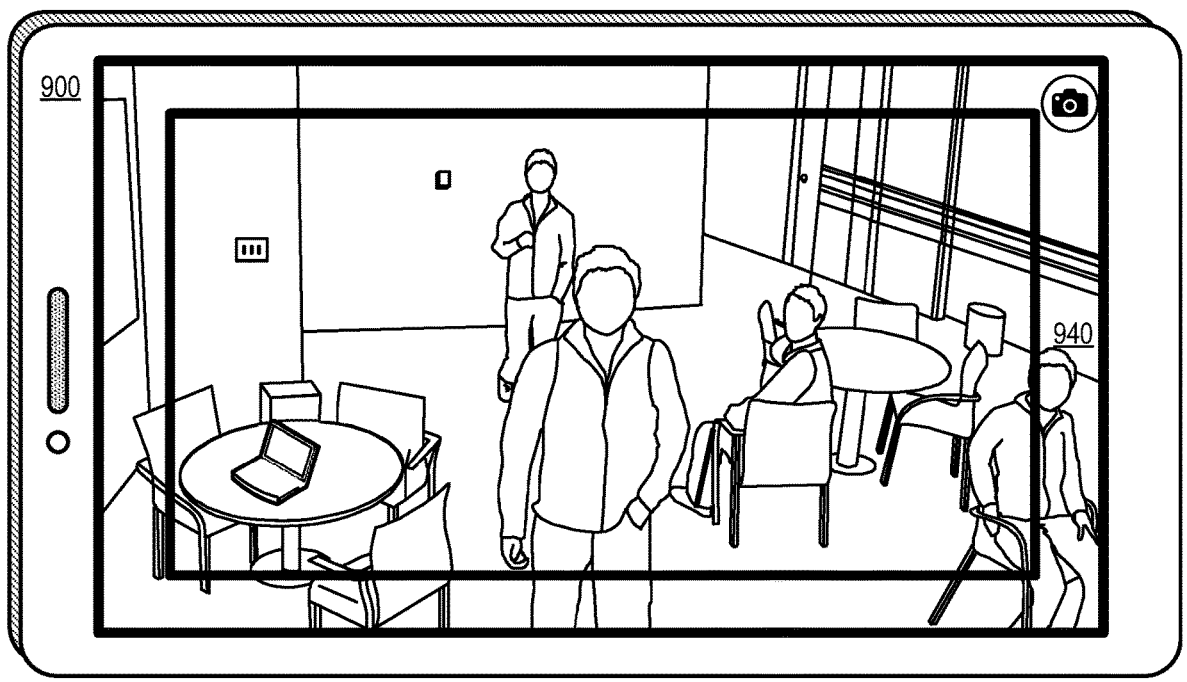
FIG. 9 is a conceptual diagram illustrating a view visible by a first image sensor with a normal lens overlaid over a view visible by a second image sensor with a wide-angle lens.

FIG. 9 is a conceptual diagram illustrating a view visible by a first image sensor with a normal lens overlaid over a view visible by a second image sensor with a wide-angle lens. An image capture device 900 of FIG. 9 displays a preview image in FIG. 9, the preview image including imaging data captured by a first image sensor of the image capture device 900 with a normal lens and a second image sensor of the image capture device 900 with a wide-angle lens, the wide-angle lens having a wider angle than the normal lens. The image capture device 900 of may include an image capture device 105A, an image processing device 105B, an image capture and processing system 100, a computing device 1800, or some combination thereof.

The entire preview image represents a view 920 visible to the second image sensor with the wide-angle lens. A black-outlined rectangle is illustrated within the preview image, the area inside the black-outlined rectangle represents a view 910 visible to the first image sensor with the normal lens. If the image capture device 900 only considers the view 910 visible to the first image sensor with the normal lens, the image capture device 900 might not detect that a subject 940—a person's face—has been cut off and not included in the view 910 visible to the first image sensor with the normal lens. However, if the image capture device 900 reviews the view 920 visible to the second image sensor with the wide-angle lens, the image capture device 900 can detect the subject 940 and can alert the user of the image capture device 900 to move the image capture device 900 if the user wishes to capture the subject 940.

Figure 10:
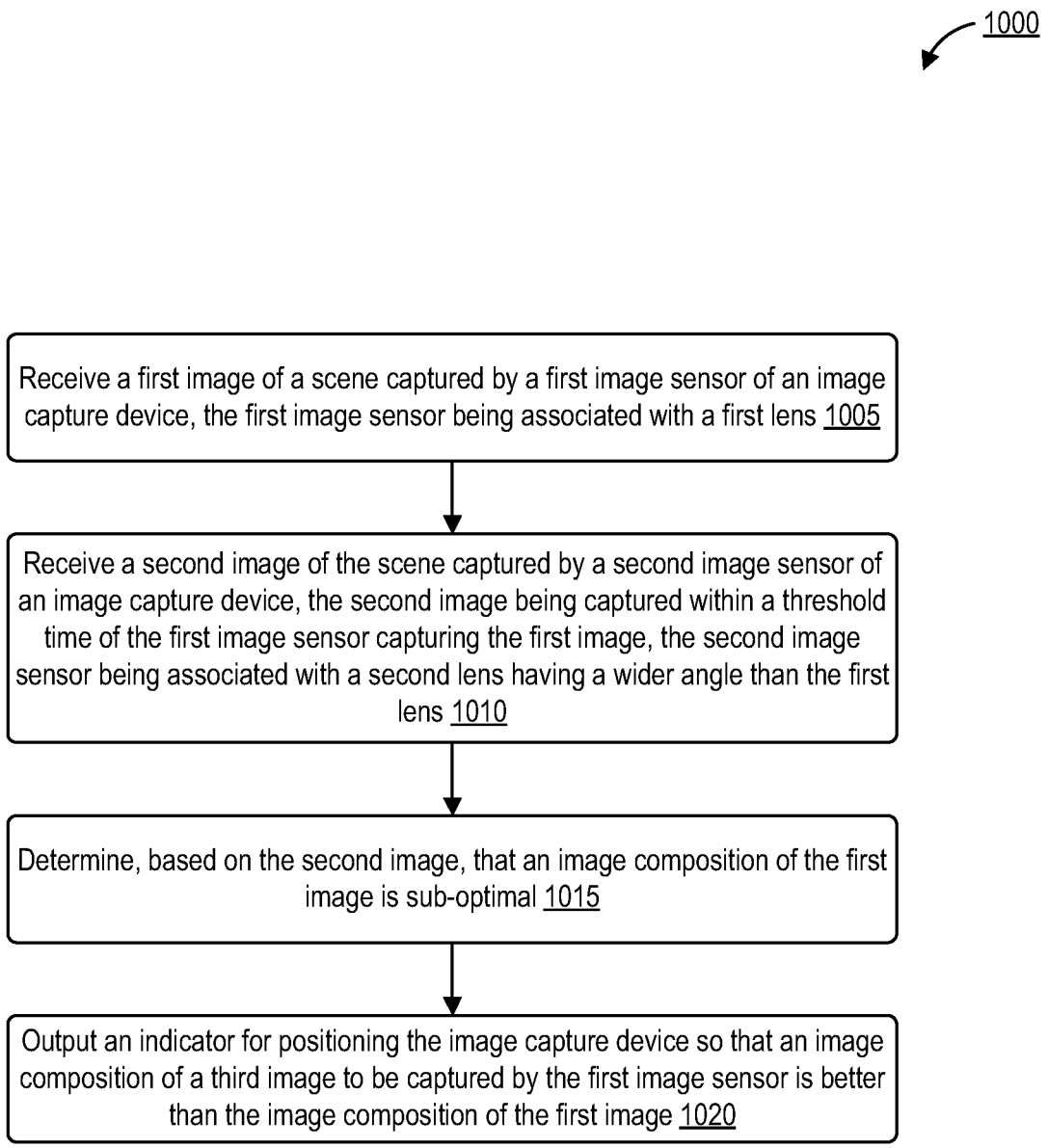
FIG. 10 is a flow diagram illustrating operations for guiding image capture using a first image sensor with a first lens based on image data from a second image sensor with a second lens having a wider angle than the first lens.

FIG. 10 is a flow diagram illustrating operations for guiding image capture using a first image sensor with a first lens based on image data from a second image sensor with a second lens having a wider angle than the first lens. Though an image capture device 105A is referenced in the operations 1000, the operations 1000 may be performed by a variety of devices, which may include an image capture device 105A, an image processing device 105B, an image capture and processing system 100, an image capture device 500/700/900/1100/1300/1500, one or more network servers of a cloud service, a computing device 1800, or some combination thereof.

At operation 1005, the device receives a first image of a scene captured by a first image sensor of an image capture device 105A, the first image sensor being associated with a first lens. At operation 1010, the device receives a second image of the scene captured by a second image sensor of an image capture device, the second image being captured by the second image sensor within a threshold time of the first image sensor capturing the first image, the second image sensor associated with a second lens having a wider angle than the first lens.

At operation 1015, the device determines, based on the second image, that an image composition of the first image is sub-optimal. At operation 1020, the device generates and outputs an indicator for positioning the image capture device so that an image composition of a third image to be captured by the first image sensor is better than the image composition of the first image.

In some cases, the device further receives the third image from the first image sensor, the third image captured by the first image sensor after the first image sensor captures the first image. Determining that the image composition of the first image is sub-optimal is based on at least a portion of a subject being out of frame of the first image, wherein the portion of the subject is included in the third image. For instance, the subject 940 is at least partially out of frame in the view 910 of FIG. 9, but once the image capture device 900 of FIG. 9 is moved to the right, the subject 940 will be in the frame in the view 910 of FIG. 9 for a later image.

In some cases, determining that an image composition of the first image is sub-optimal includes identifying a horizon in the second image and determining that the image capture device is to be tilted in order to level the horizon. Outputting the guidance for positioning the image capture device includes outputting an indicator at the image capture device identifying a direction in which the image capture device is to be tilted in order to level a horizon in the third image. The indicator includes at least one of a visual indicator, an audio indicator, and a vibrational indicator. In some cases, the indicator also identifies an angle that the image capture device is to be tilted in the direction in order to improve framing of the subject in the second image.

In some cases, at least a subset of the operations 1000 may be performed remotely by one or more network servers of a cloud service that performs image analysis (e.g., steps 1010 and/or 1015), generates and/or outputs the indicators and/or guidance of operation 1020, or some combination thereof.

Figure 11:
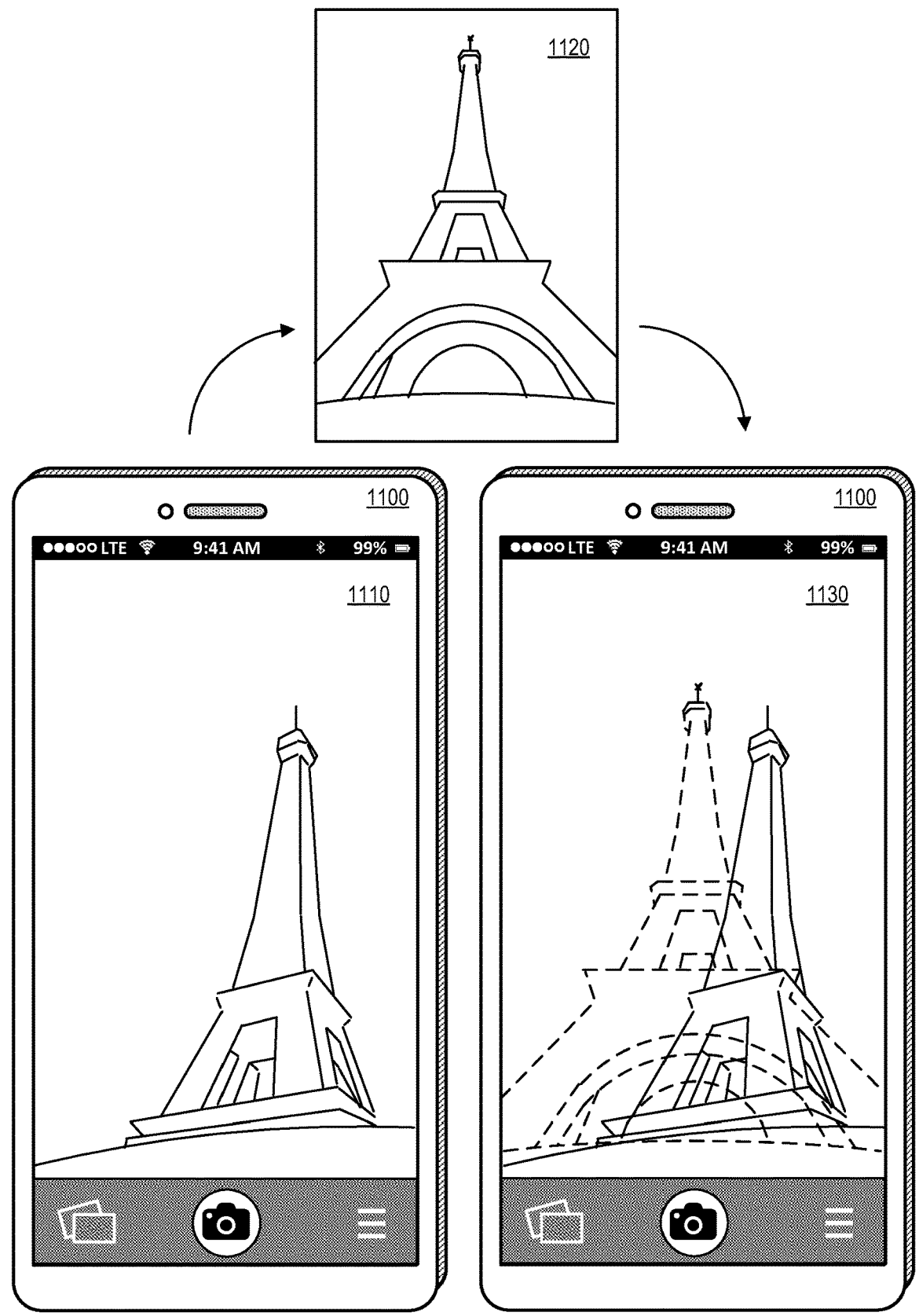
FIG. 11 is a conceptual diagram illustrating a user interface of an image capture device in which a previously-captured image of a subject is overlaid over an image of the subject captured by the image sensor of the image capture device.

FIG. 11 is a conceptual diagram illustrating a user interface of an image capture device in which a previously-captured image of a subject is overlaid over an image of the subject captured by the image sensor of the image capture device. An image capture device 1100 of FIG. 11 displays a preview image 1110 via an image capture interface. The image capture device 1100 identifies a subject in the image 1110, which in the image 1110 is the Eiffel Tower. The subject may be determined using object detection, feature detection, facial detection, or one of the other image detection or recognition techniques discussed herein. The subject may be determined based on a caption received from an input device that receives an input by a user (e.g., "I'm at the Eiffel Tower!"). The subject may be determined based on a user schedule in a calendar or clock or reminder application, for instance if the schedule identifies an event corresponding to a tour of the Eiffel Tower at a date and time matching the date and time of capture of the image, or within a threshold time of date and time of capture of the image. The subject may be determined based on a particular image capture setting chosen by a user (e.g., "sports mode," "food mode," "pet mode," "portrait mode," "landscape mode," "group photo mode," "night mode"). The subject may be determined by simply prompting the user to provide the subject (or to select from a set of possible subjects determined by the device) before, during, and/or after capture of an image. The subject may be determined based on the image capture device 1100 identifying that the location of the image capture device 1100 during capture or within a threshold time of capture is within a threshold distance of a known location of the subject (here, a known location of the Eiffel Tower). The image capture device 1100 can determine its location based on signals received by a GNSS/GPS receiver of the of image capture device 1100.

The image capture device 1100 identifies a second image 1120 of the same subject—that is, of the Eiffel Tower. The second image 1120 may be a previously captured image. The second image 1120 may be one that the image capture device 1100, or another device, has determined to have good image composition based on the various image composition rules and guidelines. The second image 1120 may be one captured by a well-known photographer. The second image 1120 may be one that received a positive rating on a photography rating web site. The second image 1120 may be one that received a positive reaction (e.g., above a certain threshold of "likes" and/or "shares") on a social media website.

The image capture device 1100 then generates an overlay based on the second image 1120 and overlays the overlay over the preview image (or a later-captured preview image), illustrated as the combined image 1130. The overlay is illustrated in the combined image 1130 using dashed lines. The overlay may be combined with the preview image using alpha compositing or semitransparency. In some cases, the overlay may simply be the image data corresponding to the subject in the second image 1120, rather than all of the image data for the image 1120. In some cases, the overlay may simply be an outline of the subject in the second image 1120 rather than all of the image data for the subject in the image 1120. By showing the user of the image capture device 1100 the overlay in the combined image 1130, the user of the image capture device 1100 can better understand what an optimal image composition is for an image of the subject, and how to reposition the image capture device 1100 to achieve the optimal image composition for an image of the subject.

In some cases, the second image 1120 may include metadata identifying geographic coordinates from which it was captured (e.g., as determined using a GPS/GNNS receiver and/or altimeter of the image capture device that captured the second image 1120) and/or a direction that the camera was facing during capture (e.g., as determined using a GPS/GNNS receiver and/or accelerometer and/or gyroscope of the image capture device that captured the second image 1120). In such cases, the image capture device 1100 can also display or otherwise output an indicator that identifies coordinates to which the image capture device 1100 should be moved in order to capture an image similar to the second image 1120, and in some cases a direction that the image capture device 1100 should face in order to capture an image similar to the second image 1120. These coordinates may include geographic coordinates such as latitude and longitude coordinates. These coordinates may include an altitude coordinate instead of or in addition to the latitude and longitude coordinates. In some cases, the indicator may include a map that may show the current position of the image capture device 1100 (the "first position" of the image capture device 1100) as well as the position to which the image capture device 1100 should be moved in order to capture an image similar to the second image 1120 (the "second position" of the image capture device 1100). In some cases, a path may be illustrated on the map from the first position of the of the image capture device 1100 to the second position of the of the image capture device 1100. The path may be generated based on navigation for walking, driving, public transit, or some combination thereof. The indicator may also include a direction that the image capture device 1100 should face at the second position in order to capture an image similar to the second image 1120. The direction may include a compass direction (e.g., north, east, south, west, or some direction in between), which may be illustrated on the map if the map is used. The direction may include angles corresponding to yaw, pitch, roll, or some combination thereof.

In some cases, multiple overlays and/or other position indicators may be provided corresponding to multiple subjects visible in the preview image 1110 and/or possible subjects that are known to be nearby. For instance, if the current position (first position) of the image capture device 1100 is in Times Square in downtown Manhattan (New York), a list may be output by the image capture device 1100 of subjects visible in the preview image 1110, subjects known to be within Times Square, subjects known to be within a predetermined radius of Times Square, subjects known to be within a predetermined radius of the first position of the image capture device 1100, or some combination thereof. A user of the image capture device 1100 may select one or more of these subjects from the list, and an overlay (as in the combined image 1130) may be generated and output for that subject based on the second image 1120, and any other position indicator discussed herein (e.g., coordinates, map, etc.) can be generated and output for that subject as well. If a different subject is selected from the list than the subject in the second image 1120, a different second image 1120 for the chosen subject may be identified and used.

Figure 12:
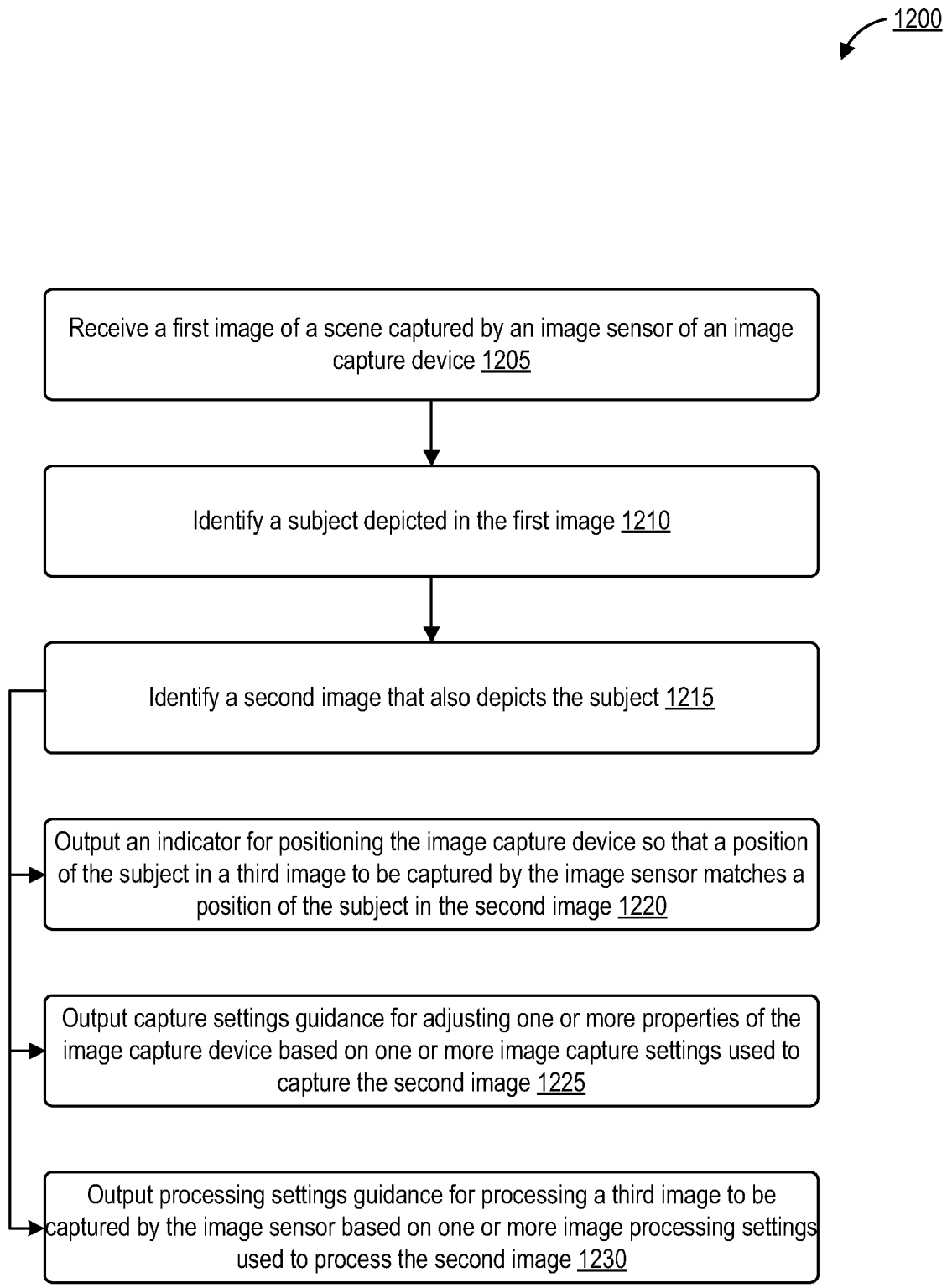
FIG. 12 is a flow diagram illustrating operations for guiding capture and/or processing of an image of a subject based on another image of the same subject.

FIG. 12 is a flow diagram illustrating operations for guiding capture and/or processing of an image of a subject based on another image of the same subject. Though an image capture device 105A is referenced in the operations 1200, the operations 1200 may be performed by a variety of devices, which may include an image capture device 105A, an image processing device 105B, an image capture and processing system 100, an image capture device 500/700/ 900/1100/1300/1500, one or more network servers of a cloud service, a computing device 1800, or some combination thereof.

At operation 1205, the device receives a first image of a scene captured by an image sensor of an image capture device. At operation 1210, the device identifies a subject depicted in the first image. At operation 1215, the device identifies a second image that also depicts the subject. Operations 1210 and/or 1215 may be performed using object detection, feature detection, facial detection, or one of the other image detection or recognition techniques discussed herein.

In some cases, the device receives sensor measurement data from one or more positioning sensors of the image capture device, including a global navigation satellite system (GNSS) receiver. The device determines a location of the image capture device 105A within a threshold time of a time of capture of the first image. Identifying that the subject is depicted in the first image at operation 1210 is based on identifying that the location of the image capture device is within a threshold distance of a location of the subject.

Operation 1215 is followed by operation 1220, operation 1225, operation 1230, or some combination thereof. At operation 1220, the device generates and outputs an indicator for positioning the image capture device so that a position of the subject in a third image to be captured by the image sensor matches a position of the subject in the second image. In some cases, outputting the indicator includes overlaying at least a portion of the second image over a preview image displayed by the image capture device (as in the combined image 1130 of FIG. 11), for instance using alpha compositing.

At operation 1225, the device generates and outputs capture settings guidance for adjusting one or more properties of the image capture device based on one or more image capture settings used to capture the second image. In some cases, outputting the capture settings guidance includes automatically adjusting the one or more properties of the image capture device based on the one or more image capture settings prior to capture of the third image by the image sensor. Image capture settings may include, for instance, zoom, focus, exposure time, aperture size, ISO, depth of field, analog gain, f/stop, or some combination thereof.

At operation 1230, the device generates and outputs processing settings guidance for processing a third image to be captured by the image sensor based on one or more image processing settings that were applied to the second image. In some cases, outputting the processing settings guidance includes automatically applying the one or more image processing settings to the third image in response to receipt of the third image from the image sensor. Image processing settings may include, for instance, brightness, contrast, saturation, gamma, levels, histogram, color levels, color warmth, blur, sharpness, levels, curves, filters, cropping, or some combination thereof. Filters may include high-pass filters, low-pass filters, band-pass filters, band-stop filters, or some combination thereof. Filters may also refer to visual effects applied to images that automatically adjust one or more previously-mention image processing settings to apply a particular "look" to an image, for instance filters specifically applying a "vintage photo" look mimicking photographs captured using film cameras from a certain era, or that modify an image to make it appear painted or hand-drawn, or some other visual modification.

In some cases, at least a subset of the operations 1200 may be performed remotely by one or more network servers of a cloud service that performs image analysis (e.g., step 1210), finds the second image (e.g., step 1215), generates and/or outputs the indicators and/or guidance (e.g., operations 1220, 1225, and/or 1230), or some combination thereof.

Figure 13:
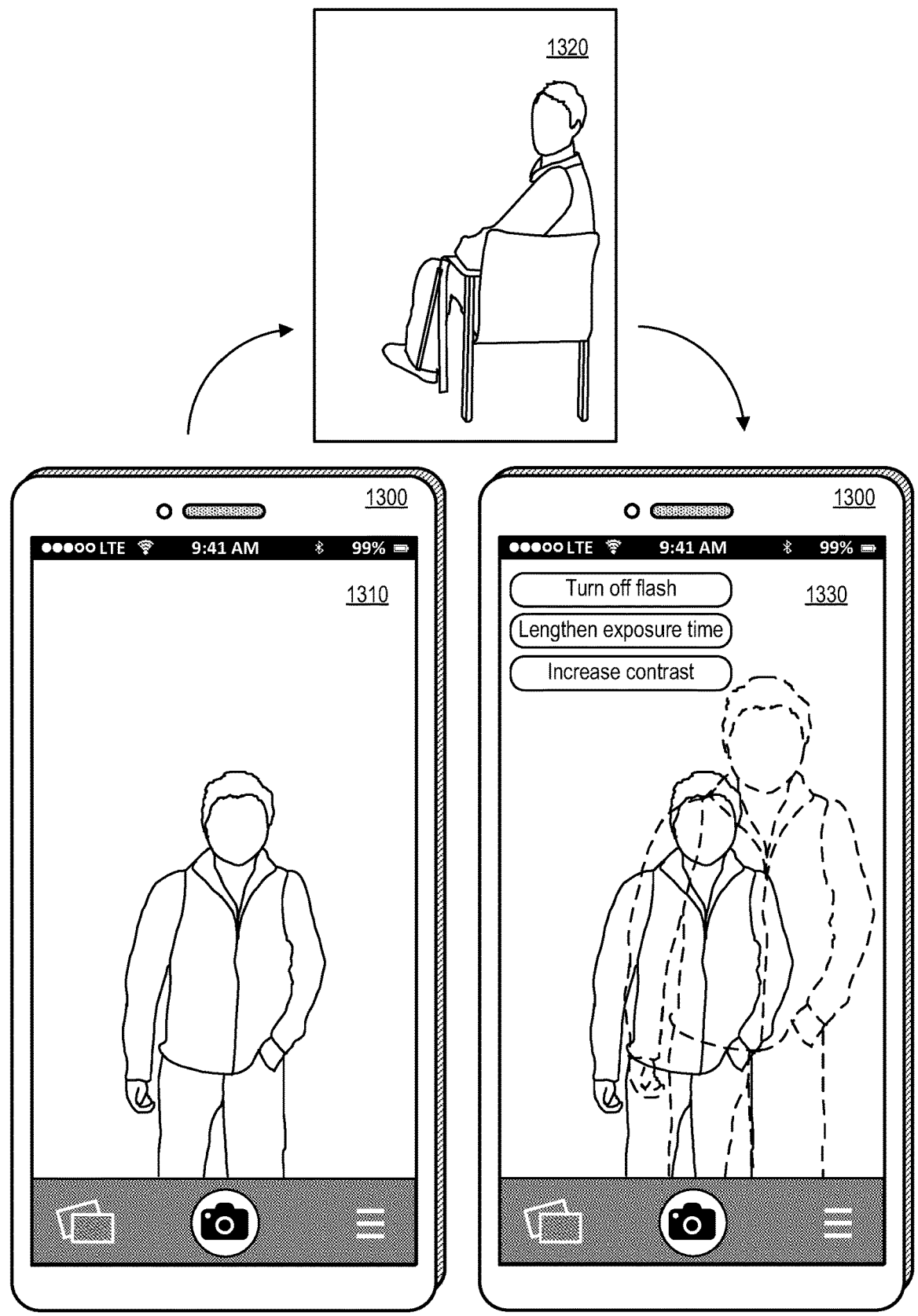
FIG. 13 is a conceptual diagram illustrating a user interface of an image capture device in which a previously-captured image of a subject is used to generate a guidance overlay over an image of a different subject captured by the image sensor of the image capture device.

FIG. 13 is a conceptual diagram illustrating a user interface of an image capture device in which a previously-captured image of a subject is used to generate a guidance overlay over an image of a different subject captured by the image sensor of the image capture device. An image capture device 1300 of FIG. 13 displays a preview image 1310 via an image capture interface. The image capture device 1300 identifies a subject in the preview image 1310, which in the preview image 1310 is a person standing up. The subject may be determined using object detection, feature detection, facial detection, or one of the other image detection or recognition techniques discussed herein. The subject may be determined based on the image capture device 1300 identifying that the location of the image capture device 1300 during capture or within a threshold time of capture is within a threshold distance of a known location of the subject (for example, if the person is sharing their location via social media or other means). The image capture device 1300 can determine its location based on signals received by a GNSS/GPS receiver of the of image capture device 1300.

The image capture device 1300 identifies a second image 1320 of a different subject—that is, of a different person, sitting down. The different subject depicted in the second image 1320 can, in some cases, be a same type of object as the subject depicted in the preview image 1310. For example, the subject in the preview image 1310 may be a person and the different subject in the second image 1320 may be a different person, or the same person in a different pose and/or outfit. The subject in the preview image 1310 may be an object of a particular object type (e.g., a building, a statue, a monument) and the different subject in the second image 1320 may be a different object of the same object type with similar dimensions.

The image capture device 1300 may determine that the subject in the preview image 1310 shares one or more similarities with the different subject in the second image 1320. These similarities may include a similarity in object type as discussed above. These similarities may include a similarity in dimensions. These similarities may include a similarity in color or color scheme. These similarities may include a similarity in lighting.

These similarities may include one or more saliency values associated with the subject in the preview image 1310 being within a predetermined range of one or more saliency values associated with the different subject in the second image. For example, the image capture device 1300 may generate a first saliency map of the preview image 1310 and a second saliency map of the second image 1320. The first saliency map includes a saliency value corresponding each pixel of the preview image 1310, and can also include confidence values corresponding to each saliency value. The second saliency map includes a saliency value corresponding each pixel of the second image 1320, and can also include confidence values corresponding to each saliency value. The image capture device 1300 can locate the subject of the preview image 1310 based on a pattern of saliency values in the first saliency map. The image capture device 1300 can locate the different subject of the second image 1320 based on a pattern of saliency values in the second saliency map. The image capture device 1300 can determine that the subject of the preview image 1310 is similar to the different subject of the second image 1320 based on a degree of similarity between the pattern of saliency values in the first saliency map and the pattern of saliency values in the second saliency map.

The second image 1320 may be a previously captured image. As with the second image 1120 of FIG. 11, the second image 1320 may be one that the image capture device 1300 (or another device) has determined to have good image composition, that was captured by a well-known photographer, that received a positive rating on a photography rating web site, that received a positive reaction (e.g., above a certain threshold of "likes" and/or "shares") on a social media website, or some combination thereof. In some cases, the image capture device 1300 (or another device) can select the second image 1320 from a set of image based on one or more similarities of the subject of the preview image 1310 to the different subject of the second image 1320. In some cases, the image capture device 1300 can decline to select a second image 1320 if the second saliency map includes a pattern of saliency values with corresponding confidence values that, on average, fall below a threshold. The threshold may be determined based on an average of the confidence values corresponding to a pattern of saliency values corresponding to the subject in the first saliency map.

The image capture device 1300 then generates an overlay based on the second image 1320 and overlays the overlay over the preview image 1310 (or a later-captured preview image), illustrated as the combined image 1330. The overlay is illustrated in the combined image 1330 using dashed lines. The overlay may be combined with the preview image using alpha compositing or semitransparency.

In some cases, the overlay may include image data corresponding to the second image 1320, to the subject in the second image 1320, or to an outline or other abstract representation of the subject in the second image 1320. Alternately, as shown in the combined image 1330, FIG. 13, the overlay may include image data corresponding to the preview image 1310, the subject in the second image 1320, or to an outline or other abstract representation of the subject in the second image 1320. Even where the overlay is based on image data corresponding to at least some of the first image 1310, the positioning and size and orientation of the overlay may be based on the positioning and size and orientation of the subject in the second image 1320. By showing the user of the image capture device 1300 the overlay in the combined image 1330, the user of the image capture device 1300 can better understand what an optimal image composition is for an image of the subject, and how to reposition the image capture device 1300 to achieve the optimal image composition for an image of the subject. For instance, in the combined image 1330, the subject in the overlay is larger and further to the right in the combined image 1330, suggesting that the user should bring the image capture device 1300 closer to the subject (or zoom in) and move the image capture device 1300 to the left so that the subject appears further to the right in the image to be captured by the image capture device 1300.

In some cases, the combined image 1330 may also include an indicator that identifies a position to which the image capture device 1300 should be moved from its current position (the "first position" of the image capture device 1300) to a position in which the image capture device 1300 can capture an image similar to the overlay that is based on the second image 1320 (the "second position" of the image capture device 1300). The indicator may include geographic coordinates of the first position and/or of the second position, which may include latitude coordinates, longitude coordinates, and/or altitude coordinates. In some cases, the indicator may include a map that may show the first position of the image capture device 1300, the second position of the image capture device 1300, a path from the first position to the second position, or some combination thereof. The indicator may also include a direction that the image capture device 1300 should face at the second position in order to capture an image similar to the overlay that is based on the second image 1320. The direction may include a compass direction (e.g., north, east, south, west, or some direction in between), which may be illustrated on the map as an arrow. The direction may include angles corresponding to yaw, pitch, roll, or some combination thereof.

In some cases, multiple overlays and/or other position indicators may be provided corresponding to multiple subjects visible in the preview image 1310 and/or possible subjects that are known to be nearby. For instance, if the current position (first position) of the image capture device 1300 is in Times Square in downtown Manhattan (New York), a list may be output by the image capture device 1300 of subjects visible in the preview image 1310, subjects known to be within Times Square, subjects known to be within a predetermined radius of Times Square, subjects known to be within a predetermined radius of the first position of the image capture device 1300, or some combination thereof. A user of the image capture device 1300 may select one or more of these subjects from the list, and an overlay (as in the combined image 1330) may be generated and output for that subject based on the second image 1320, and any other position indicator discussed herein (e.g., coordinates, map, etc.) can be generated and output for that subject as well. In some cases, the second image 1320 may be chosen based on a subject type of the subject selected from the list. For instance, if the subject selected from the list is a building, the second image 1320 may be chosen to be a picture of a building. If the subject selected from the list is a person, the second image 1320 may be chosen to be a picture of a person.

The image capture device 1300 also provides image capture settings guidance and image processing settings guidance overlaid over the combined image 1330. In particular, the image capture device 1300 generates and displays a guidance box indicating "turn off flash" to suggest to the user to turn off flash. This suggestion may be based on the second image 1320 having been captured without flash. In some cases, the image capture device 1300 may automatically turn off flash instead of or in addition to displaying such a guidance box. The image capture device 1300 also generates and displays a guidance box indicating "lengthen exposure time" to suggest to the user to lengthen the exposure time before capture. This suggestion may be based on the second image 1320 having been captured with a longer exposure time than the image capture device 1300 is currently set to. In some cases, the image capture device 1300 may automatically lengthen the exposure time instead of or in addition to displaying such a guidance box. The image capture device 1300 also generates and displays a guidance box indicating "increase contrast" to suggest to the user to increase contrast after image capture during image processing. This suggestion may be based on the second image 1320 having been processed to increase contrast after capture, or based on the second image 1320 simply having a higher contrast than the images currently being received from the image sensor of the image capture device 1300. In some cases, the image capture device 1300 may automatically increase contrast after capturing an image instead of or in addition to displaying such a guidance box.

A benefit of generating the guidance (e.g., the overlay, image capture settings, and/or image processing settings) based on the second image 1320 that has a different subject than the subject of the preview image 1310 is flexibility. For example, if the second image 1320 is selected from a set of images, the image capture device 1300 (or another device) performing the selection need not find an image with the exact same subject as the preview image 1310. Thus, if the preview image 1310 depicts a person as its subject, the image capture device 1300 (or another device) performing the selection needs only to find a second image 1320 with another person, or another object with similarities to the person in the preview image 1310. Similarly, if the preview image 1310 depicts the Eiffel Tower its subject, the image capture device 1300 (or another device) performing the selection needs only to find a second image 1320 with another building, or another object with similarities to the Eiffel Tower in the preview image 1310. Thus, the image capture device 1300 can generate and output useful guidance even for obscure or unusual subjects.

Figure 14:
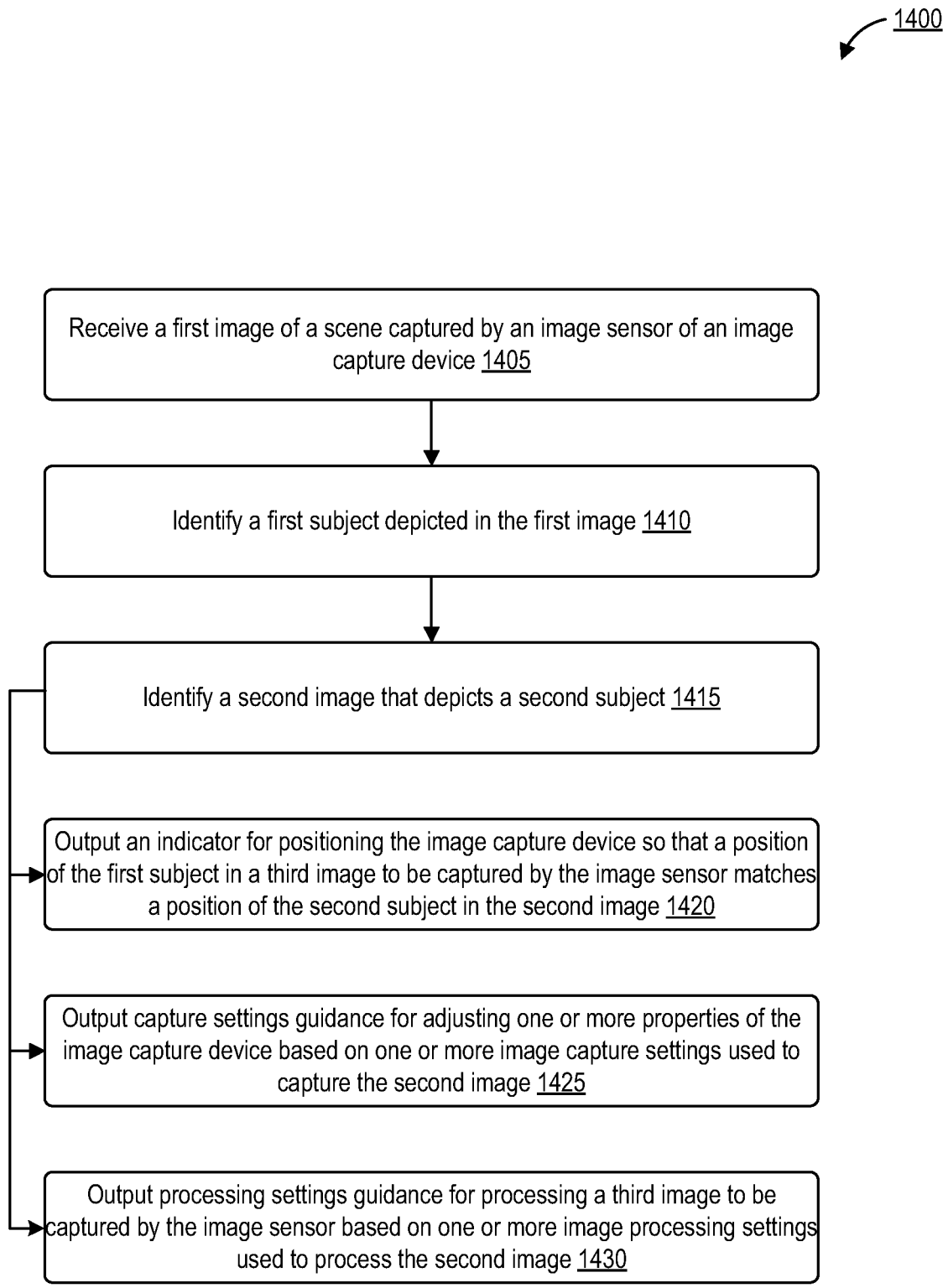
FIG. 14 is a flow diagram illustrating operations for guiding capture and/or processing of an image of a subject based on another image of a different subject.

FIG. 14 is a flow diagram illustrating operations for guiding capture and/or processing of an image of a subject based on another image of a different subject. Though an image capture device 105A is referenced in the operations 1400, the operations 1400 may be performed by a variety of devices, which may include an image capture device 105A, an image processing device 105B, an image capture and processing system 100, an image capture device 500/700/900/1100/1300/1500, one or more network servers of a cloud service, a computing device 1800, or some combination thereof.

At operation 1405, the device receives a first image of a scene captured by an image sensor of an image capture device. At operation 1410, the device identifies a first subject depicted in the first image, for instance using object detection, feature detection, facial detection, or one of the other image detection or recognition techniques discussed herein. At operation 1415, the device identifies a second image that depicts a second subject.

Operation 1415 is followed by operation 1420, operation 1425, operation 1430, or some combination thereof. At operation 1420, the device generates and outputs an indicator for positioning the image capture device so that a position of the first subject in a third image to be captured by the image sensor matches a position of the second subject in the second image. In some cases, outputting the indicator includes overlaying at least a portion of the second image over a preview image displayed by the image capture device (or an edited portion of the first image as in the combined image 1330 of FIG. 13), for instance using alpha compositing.

At operation 1425, the device generates and outputs capture settings guidance for adjusting one or more properties of the image capture device based on one or more image capture settings used to capture the second image. In some cases outputting the capture settings guidance includes automatically adjusting the one or more properties of the image capture device based on the one or more image capture settings prior to capture of the third image by the image sensor.

At operation 1430, the device generates and outputs processing settings guidance for processing a third image to be captured by the image sensor based on one or more image processing settings that were applied to the second image. In some cases, outputting the processing settings guidance includes automatically applying the one or more image processing settings to the third image in response to receipt of the third image from the image sensor.

In some cases, at least a subset of the operations 1400 may be performed remotely by one or more network servers of a cloud service that performs image analysis (e.g., step 1410), finds the second image (e.g., step 1415), generates and/or outputs the indicators and/or guidance (e.g., operations 1420, 1425, and/or 1430), or some combination thereof.

Figure 15:
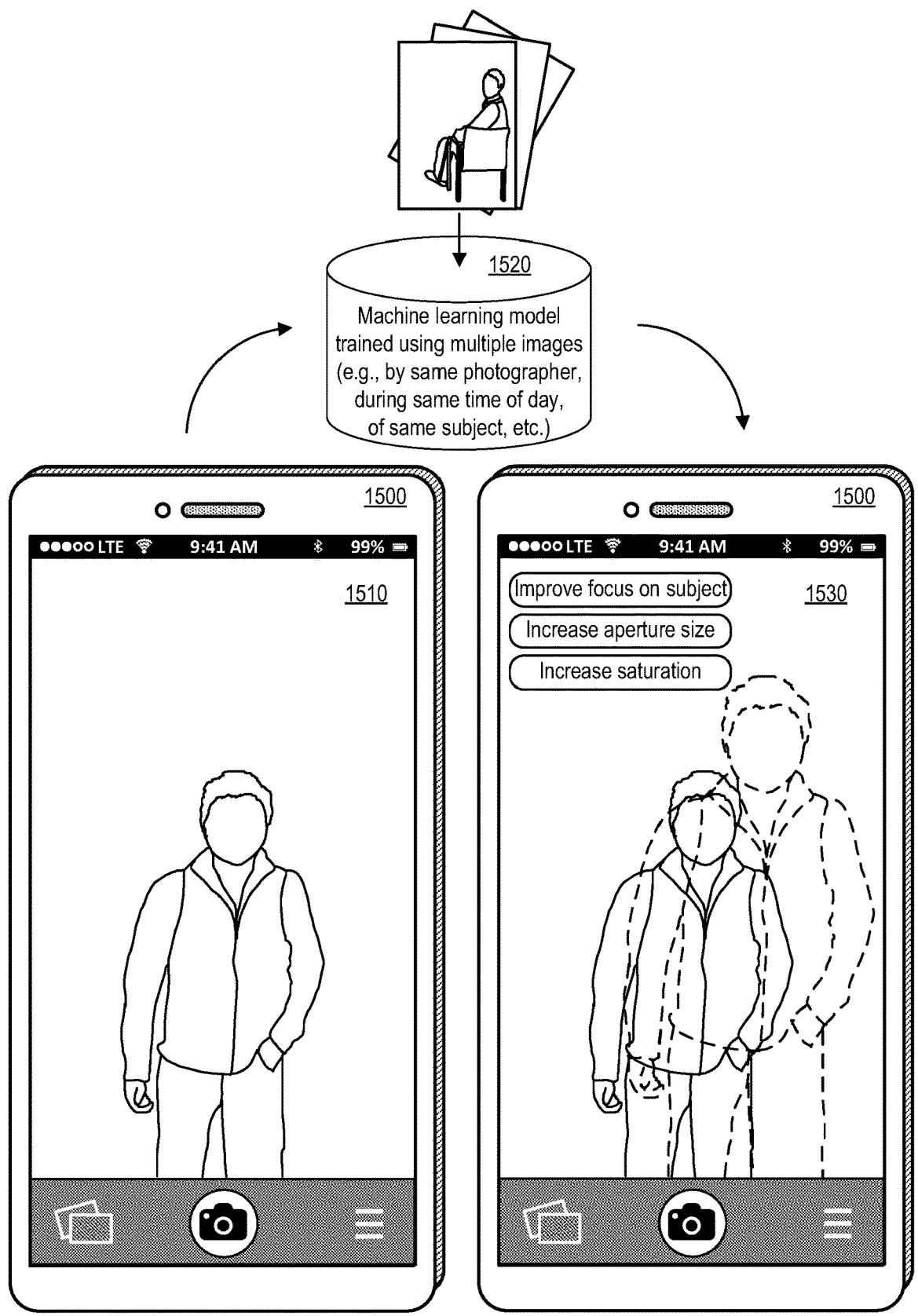
FIG. 15 is a conceptual diagram illustrating a user interface of an image capture device in which a machine learning model trained using a set of images is used to generate a guidance overlay over an image of a subject captured by the image sensor of the image capture device.

FIG. 15 is a conceptual diagram illustrating a user interface of an image capture device in which a machine learning model trained using a set of images is used to generate a guidance overlay over an image of a subject captured by the image sensor of the image capture device. An image capture device 1500 of FIG. 15 displays a preview image 1510 via an image capture interface. The image capture device 1500 identifies a subject in the preview image 1510, which in the preview image 1510 is a person standing up. The subject may be determined using object detection, feature detection, facial detection, or one of the other image detection or recognition techniques discussed herein.

The image capture device 1500 inputs the preview image 1510 into a machine learning model 1520. The machine learning model 1520 is trained using a set of images having identified subjects. The machine learning model 1520 outputs one or more insights based on the preview image 1510 and based on its training. These insights may include, for example, an alternate positioning of the subject in the preview image 1510 generated using the machine learning model, image capture settings generated using the machine learning model, image processing settings generated using the machine learning model, or some combination thereof.

The set of images that the machine learning model 1520 is trained using may be selected based on the set of images all being captured by a particular photographer, painter, or other artist. The user of the image capture device 1500 may choose this photographer. For instance, the user of the image capture device 1500 may choose the use a machine learning model 1520 that is trained using photos captured by photographer Ansel Adams. The insights generated by the machine learning model 1520 could thus help tweak the image composition, image capture settings, and image processing settings that the user of the image capture device 1500 uses to be more similar to those used by photographer Ansel Adams. Similarly, the user of the image capture device 1500 may choose the use a machine learning model 1520 that is trained using paintings painted by artist Monet. The insights generated by the machine learning model 1520 could thus help tweak the image composition, image capture settings, and image processing settings that the user of the image capture device 1500 uses to generate a look and style similar to that of paintings painted by Monet.

The set of images that the machine learning model 1520 is trained using may be selected based on the set of images all having a similar type of scene and/or type of subject. For example, if the subject is a building, then even if the exact identity of the building is not identifiable, a machine learning model 1520 that is trained using a set of images all having buildings may be used. The insights generated by the machine learning model 1520 could thus help tweak the image composition, image capture settings, and image processing settings that the user of the image capture device 1500 uses to be appropriate for photographing buildings, and may for instance reduce glare from windows. In another example, if an image is of a baby at the Grand Canyon, the image capture device 1500 may prompt the user to specify whether the focus of the image is the baby or the landscape, and may choose either a machine learning model 1520 trained using baby images or a machine learning model 1520 trained using natural landscape images. Some image capture devices 1500 have features that allow the image capture devices 1500 to receive input from a user. The subject may be determined based on a particular image capture setting chosen by a user. For instance, if the user selects a "sports mode," the scene is likely a sports scene with a subject being a player or game situation. If the user selects a "food mode," the scene is likely a kitchen or dining scene with a subject being food. If the user selects a "pet mode," the scene/subject is likely a fast-moving pet. If the user selects a "portrait mode," the scene/subject is likely a person holding a particular pose. If the user selects a "landscape mode," the scene/subject is likely a natural or urban landscape. If the user selects a "group photo mode," the scene/subject is likely a group of people. If the user selects a "night mode," the scene/subject is likely either the night sky or a dimly-illuminated outdoor scene. A machine learning model 1520 may be selected that is trained using training images with the same kinds of subjects and/or scenes in order to develop appropriate insights.

The set of images that the machine learning model 1520 is trained using may be selected based on the set of images all being captured during a certain time of day, which may be determined based on a clock of the image capture device 1500 and/or a calendar indicating time of year. The insights generated by the machine learning model 1520 could thus help tweak the image composition, image capture settings, and image processing settings that the user of the image capture device 1500 uses to be appropriate for the time of day (e.g., sunrise, daytime, sunset, dusk, nighttime) during which the user wishes to capture a photo. The set of images that the machine learning model 1520 is trained using may be selected based on the set of images all being captured indoors, or outdoors, so that the insights generated by the machine learning model 1520 could thus help tweak the image composition, image capture settings, and image processing settings that the user of the image capture device 1500 uses to be appropriate for indoor or outdoor photography. The set of images that the machine learning model 1520 is trained using may be selected based on the set of images all being captured during a certain type of weather (e.g., sunny, cloudy, rainy, snowing) so that the insights generated by the machine learning model 1520 could thus help tweak the image composition, image capture settings, and image processing settings that the user of the image capture device 1500 uses to be appropriate for the weather during the time of capture and at the location of capture of an image by the image capture device 1500. The set of images that the machine learning model 1520 is trained using may be selected based on the set of images that the image capture device 1500 (or another device) has determined to have good image composition, that received a positive rating on a photography rating website, or that received a positive reaction (e.g., above a certain threshold of "likes" and/or "shares") on a social media website. In some cases, the set of images that the machine learning model 1520 is trained using may be selected based on the set of images having some combination of the above-identified traits.

The image capture device 1500 then generates an overlay based on the alternate positioning of the subject in the preview image 1510 generated using the machine learning model and overlays the overlay over the preview image (or a later-captured preview image), illustrated as the combined image 1530. The overlay is illustrated in the combined image 1530 using dashed lines. The overlay may be combined with the preview image using alpha compositing or semitransparency. As shown in the combined image 1530, FIG. 15, the overlay may include image data corresponding to the preview image 1510, to the subject in the preview image 1510, or to an outline or other abstract representation of the subject in the preview image 1510. By showing the user of the image capture device 1500 the overlay in the combined image 1530, the user of the image capture device 1500 can better understand what an optimal image composition is for an image of the subject, and how to reposition the image capture device 1500 to achieve the optimal image composition for an image of the subject.

In some cases, the combined image 1530 may also include an indicator that identifies a position to which the image capture device 1500 should be moved from its current position (the "first position" of the image capture device 1500) to a position in which the image capture device 1300 can capture an image similar to the overlay that is based on the machine learning model 1520 (the "second position" of the image capture device 1500). The indicator may include geographic coordinates of the first position and/or of the second position, which may include latitude coordinates, longitude coordinates, and/or altitude coordinates. In some cases, the indicator may include a map that may show the first position of the image capture device 1500, the second position of the image capture device 1500, a path from the first position to the second position, or some combination thereof. The indicator may also include a direction that the image capture device 1500 should face at the second position in order to capture an image similar to the overlay that is based on the machine learning model 1520. The direction may include a compass direction (e.g., north, east, south, west, or some direction in between), which may be illustrated on the map as an arrow. The direction may include angles corresponding to yaw, pitch, roll, or some combination thereof.

In some cases, multiple overlays and/or other position indicators may be provided corresponding to multiple subjects visible in the preview image 1510 and/or possible subjects that are known to be nearby. For instance, if the current position (first position) of the image capture device 1500 is in Times Square in downtown Manhattan (New York), a list may be output by the image capture device 1500 of subjects visible in the preview image 1510, subjects known to be within Times Square, subjects known to be within a predetermined radius of Times Square, subjects known to be within a predetermined radius of the first position of the image capture device 1500, or some combination thereof. A user of the image capture device 1500 may select one or more of these subjects from the list, and an overlay (as in the combined image 1530) may be generated and output for that subject based on the machine learning model 1520, and any other position indicator discussed herein (e.g., coordinates, map, etc.) can be generated and output for that subject as well. In some cases, the machine learning model 1520 may be selected so that a subject type of the set of training images used to train the machine learning model 1520 matches a subject type of the subject selected from the list. For instance, if the subject selected from the list is a building, a machine learning model 1520 may be selected that is trained on set of training images of buildings. If the subject selected from the list is a person, a machine learning model 1520 may be selected that is trained on set of training images of people.

The image capture device 1500 also provides image capture settings guidance and image processing settings guidance overlaid over the combined image 1530. In particular, the image capture device 1500 generates and displays a guidance box indicating "improve focus on subject" to suggest to the user to tweak the focus (e.g., as controlled by the focus control mechanisms 125B) to ensure that the subject is in focus, for instance based on the machine learning model having been trained using a set of images that generally have better focus on their subjects. In some cases, the image capture device 1500 may automatically improve focus on the subject instead of or in addition to displaying such a guidance box. The image capture device 1500 also generates and displays a guidance box indicating "increase aperture size" to suggest to the user to increase aperture size before capture, for instance based on the machine learning model having been trained using a set of images that generally have larger aperture size than is currently set for the image capture device 1500. In some cases, the image capture device 1500 may automatically increase aperture size instead of or in addition to displaying such a guidance box. The image capture device 1500 also generates and displays a guidance box indicating "increase saturation" to suggest to the user to increase saturation after image capture during image processing, for instance based on the machine learning model having been trained using a set of images in which saturation was increased during processing or that simply have a higher saturation. In some cases, the image capture device 1500 may automatically increase contrast after capturing an image instead of or in addition to displaying such a guidance box.

The machine learning model 1520 may be trained using the set of images using a machine learning algorithm. The machine learning algorithm may be a neural network (NN), such as a convolutional neural network (CNN), a time delay neural network (TDNN), a deep feed forward neural network (DFFNN), a recurrent neural network (RNN), an auto encoder (AE), a variation AE (VAE), a denoising AE (DAE), a sparse AE (SAE), a Markov chain (MC), a perceptron, or some combination thereof. The machine learning algorithm may be a supervised learning algorithm, a deep learning algorithm, or some combination thereof.

In some cases, the image capture device 1500 may include two to more cameras (e.g. two image sensors 130 with two corresponding lenses) that both point at the same scene. In some cases, the image capture device 1500 applies image capture settings and/or image processing settings generated using the machine learning model 1520 to only one of these cameras, while allowing another one of the cameras to capture an image simultaneously (or within a threshold time of the capture of the other image) with the image capture device 105A's previously-set image capture settings and/or image processing settings. In some cases, both images may then be displayed to a user of the image capture device 105A, and the user of the image capture device 105A may choose to keep only one of the two images while deleting the other, or may choose to keep both images.

Figure 16:
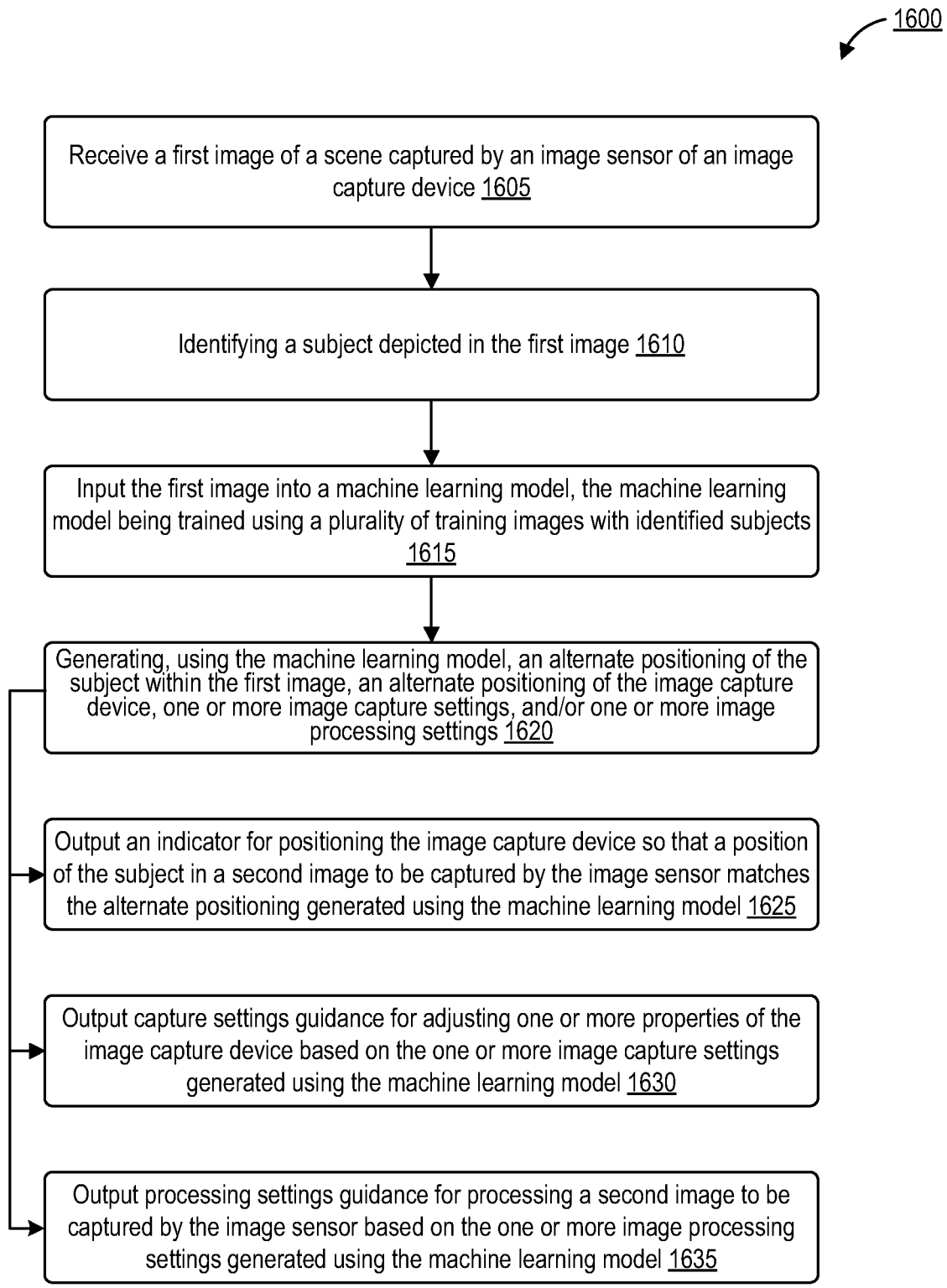
FIG. 16 is a flow diagram illustrating operations for guiding capture and/or processing of an image of a subject based on a machine learning model trained using a set of images.

FIG. 16 is a flow diagram illustrating operations 1600 for guiding capture and/or processing of an image of a subject based on a machine learning model 1520 trained using a set of training images. Though an image capture device 105A is referenced in the operations 1600, the operations 1600 may be performed by a variety of devices, which may include an image capture device 105A, an image processing device 105B, an image capture and processing system 100, an image capture device 500/700/900/1100/1300/1500, one or more network servers of a cloud service, a computing device 1800, or some combination thereof.

At operation 1605, the device receives a first image of a scene captured by an image sensor of an image capture device. At operation 1610, the device identifies a subject depicted in the first image, for instance using object detection, feature detection, facial detection, feature recognition, object recognition, facial recognition, saliency mapping, one or more of the other image detection or recognition techniques discussed herein, or a combination thereof. At operation 1615, the device inputs the first image into a machine learning model 1520, the machine learning model 1520 being trained using a plurality of images with identified subjects. At operation 1620, the device generates, using the machine learning model 1520, an alternate positioning of the subject within the first image, an alternate positioning of the image capture device, one or more image capture settings, one or more image processing settings, or some combination thereof.

Operation 1620 is followed by operation 1625, operation 1630, operation 1635, or some combination thereof. At operation 1625, the device generates and outputs an indicator for positioning the image capture device. The indicator may be based on an alternate positioning of the image capture device determined during the operation 1620. The indicator may be based on an alternate positioning of the subject within the first image determined during the operation 1620. For example, indicator for positioning the image capture device can guide repositioning of the image capture device so that a position of the subject in a second image to be captured by the image sensor matches the alternate positioning generated using the machine learning model 1520. In some cases, outputting the indicator includes overlaying an edited portion of the first image over a preview image displayed by the image capture device (as in the combined image 1530 of FIG. 15), for instance using alpha compositing. In some cases, outputting the indicator includes displaying a set of coordinates in the world to which the image capture device should be moved, a map highlighting a location corresponding to the set of coordinates, a map highlighting a path to the set of coordinates, a set of directions to the set of coordinates, or some combination thereof. In some cases, outputting the indicator includes displaying one or more arrows indicating directions in which the image capture device is to be moved, tilted, and/or rotated, such as the arrow 550, or the arrows in the indicators 730 and 760.

At operation 1630, the device generates and outputs capture settings guidance for adjusting one or more properties of the image capture device based on the one or more image capture settings generated using the machine learning model 1520. In some cases, outputting the capture settings guidance includes automatically adjusting the one or more properties of the image capture device based on the one or more image capture settings prior to capture of the second image by the image sensor.

At operation 1635, the device generates and outputs processing settings guidance for processing a second image to be captured by the image sensor based on the one or more image processing settings generated using the machine learning model 1520. In some cases, outputting the processing settings guidance includes automatically applying the one or more image processing settings to the second image in response to receipt of the second image from the image sensor.

In some cases, at least a subset of the operations 1600 may be performed remotely by one or more network servers of a cloud service that performs image analysis (e.g., step 1610), trains the machine learning model, inputs the first image into the machine learning model (e.g., step 1615), generates and/or outputs the indicators and/or guidance (e.g., operations 1620, 1625, 1630, and/or 1635), or some combination thereof.

Figure 17:
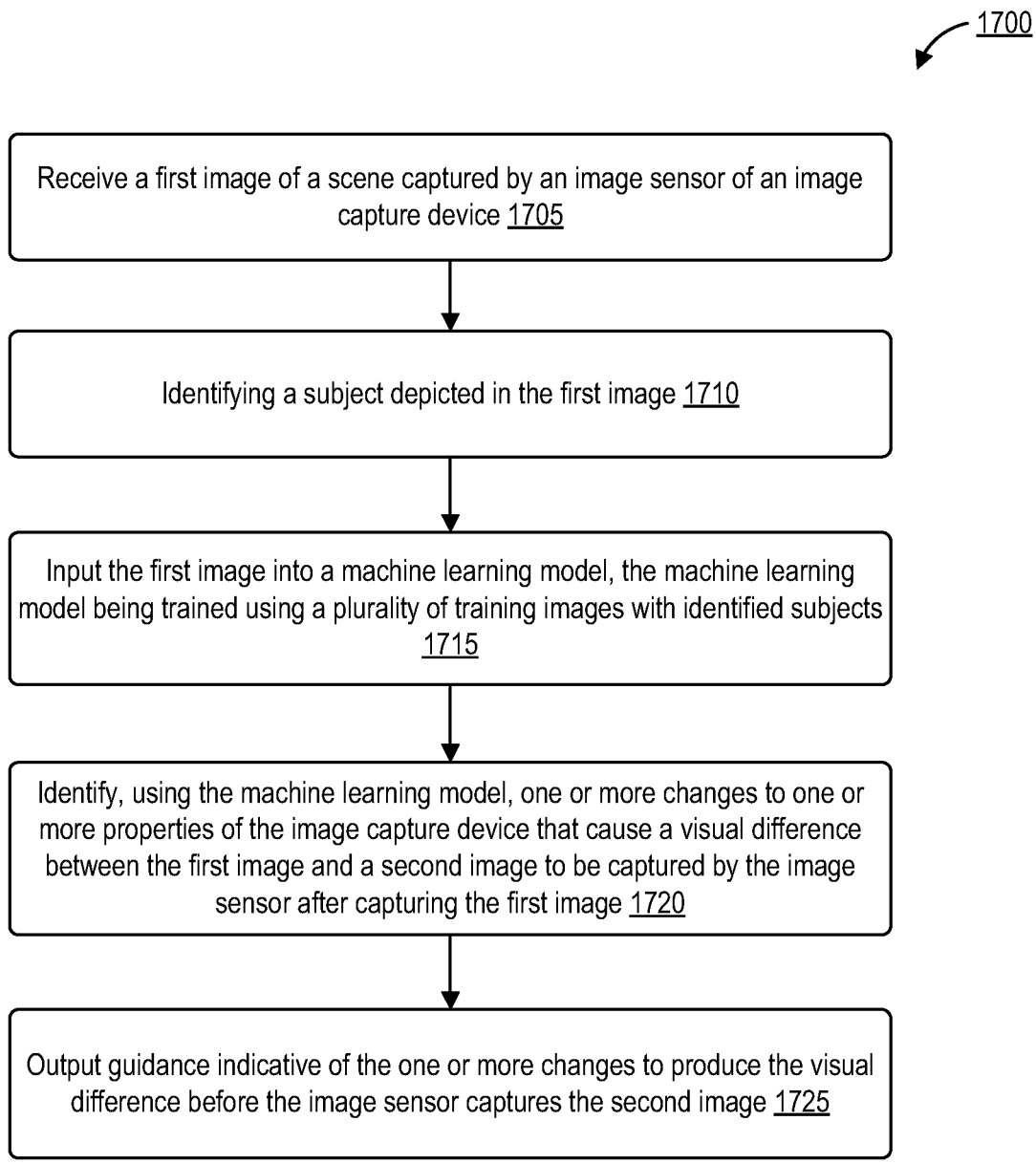
FIG. 17 is a flow diagram illustrating a method of guiding image capture.

FIG. 17 is a flow diagram illustrating a method 1700 of guiding image capture. Though an image capture device 105A is referenced in the method 1700, the method 1700 may be performed by a variety of devices, which may include an image capture device 105A, an image processing device 105B, an image capture and processing system 100, an image capture device 500/700/900/1100/1300/1500, one or more network servers of a cloud service, a computing device 1800, or some combination thereof.

The method 1700 includes an operation 1705. At operation 1705, the image capture device 105A receives a first image of a scene captured by an image sensor 130 of an image capture device 105A. The image capture device 105A can include the image senor 130. The image capture device 105A can include one or more connectors coupled to the image sensor 130. The one or more connectors may couple the image sensor 130 to a portion of the image capture device 105A, such as an image processor 150 of the image capture device 105A. The image capture device 105A (or a processor thereof) may receive the first image from the image sensor 130 through the one or more connectors.

At operation 1710, the image capture device 105A identifies a subject depicted in the first image. For instance, the image capture device 105A can identify the subject depicted in the first image using object detection, feature detection, facial detection, feature recognition, object recognition, facial recognition, saliency mapping, one or more other image detection or recognition techniques discussed herein, or a combination thereof.

At operation 1715, the image capture device 105A inputs the first image into a machine learning model 1520, the machine learning model 1520 being trained using a plurality of training images with identified subjects. The machine learning model 1520 may be based on any type of neural neural network (NN), machine learning algorithm, artificial intelligence algorithm, other algorithm discussed herein, or combination thereof. For example, the machine learning model 1520 may be based on a convolutional neural network (CNN), a time delay neural network (TDNN), a deep feed forward neural network (DFFNN), a recurrent neural network (RNN), an auto encoder (AE), a variation AE (VAE), a denoising AE (DAE), a sparse AE (SAE), a Markov chain (MC), a perceptron, or some combination thereof.

At operation 1720, the image capture device 105A identifies, using the machine learning model 1520, one or more changes to one or more properties of the image capture device 105A that cause a visual difference between the first image and a second image to be captured by the image sensor after capturing the first image. The one or more properties may be one or more properties associated with image capture. The one or more properties may include a pose of the image capture device 105A. The pose of the image capture device 105A may refer to the location of the image capture device 105A, the orientation (e.g., pitch, roll, and/or yaw) of the image capture device 105A, or both. The one or more properties may include one or more image capture settings. The one or more properties may include one or more image processing settings.

At operation 1725, the image capture device 105A outputs guidance indicative of the one or more changes to produce the visual difference before the image sensor 130 captures the second image. Outputting the guidance can include outputting a visual indicator, an audio indicator, a vibrational indicator, or a combination thereof. Outputting the guidance can include outputting one or more indicators that guide a user to move the image capture device 105A to achieve a visual difference that includes a change in perspective caused by movement of the image capture device 105A.

Outputting the guidance can include outputting one or more indicators that guide a user to apply certain image capture settings to the image capture device 105A so that the image capture settings are applied during capture of the second image. Outputting the guidance can include automatically applying image capture settings to the image capture device 105A so that the image capture settings are applied during capture of the second image. Outputting the guidance can include outputting one or more indicators that guide a user to apply certain image processing settings to the second image. Outputting the guidance can include automatically applying image processing settings to the second image.

In some cases, the image capture device 105A receives the second image from the image sensor after outputting the guidance. In some cases, the image capture device 105A output the second image, for instance by displaying the second image using a display (e.g., a display coupled to the image capture device 105A) and/or transmitting the second image to a recipient device using a transmitter. The recipient device may display the second image using a display (e.g., a display coupled to the recipient device).

Identifying the one or more changes to the one or more properties of the image capture device 105A can include identifying a movement of the image capture device 105A from a first position to a second position. Outputting the guidance at the image capture device 105A may include outputting an indicator for moving the image capture device 105A from the first position to the second position. The second position can be identified using the machine learning model. The indicator can include at least one of a visual indicator, an audio indicator, and a vibrational indicator. The indicator can include one or more location coordinates of the second position, a map with an overlaid marker that highlights the second position on the map, a map the highlights a path to the second position, a set of directions to the second position, or some combination thereof.

The indicator can identify movement information indicative of the movement of the apparatus from the first position to the second position. The movement information of the indicator can identify a translational direction from the first position to the second position and/or a translational distance from the first position to the second position. See, for example, the indicators 530, 540, and 550 depicted in FIG. 5. The movement information of the indicator can identify a rotational direction from the first position to the second position and/or a rotational angle from the first position to the second position. See, for example, the indicators 730 and 760 depicted in FIGS. 7A and 7B. The rotational direction can include any rotation about any axis or combination of axes, such as roll, pitch, yaw, or another type of rotational direction. The rotational angle may be expressed in degrees, radians, a graphical representation, or some combination thereof, and may indicate how far in the corresponding rotational direction the image capture device 105A is to be rotated. The movement information of the indicator can identify at least one of a translational direction of the movement, a translational distance of the movement, a rotational direction of the movement, a rotational angle of the movement, or a combination thereof.

The image capture device 105A can determine the direction that the subject is facing based on the subject's features.

More specifically, the device can determine a position of the subject in the first image and a direction that the subject is facing in the first image. The image capture device 105A identifies the movement of the image capture device 105A from the first position to the second position based on the position of the subject in the first image and the direction that the subject is facing in the first image. The image capture device 105A can determine the direction that the subject is facing in the first image based on positioning of a plurality of features of the subject within the first image relative to one another. If the subject is a person, the plurality of features of the subject can include at least one of an ear of the person, a cheek of the person, an eye of the person, an eyebrow of the person, a nose of the person, a mouth of the person, a chin of the person, an appendage of the person, or a combination thereof. For example, as illustrated in and discussed with respect to FIG. 4, a left distance between two features on a subject's left side (e.g., the subject's left eye and left cheek) can be compared to a right distance between two features on the subject's right side (e.g., the subject's right eye and right cheek). If the image capture device 105A determines that the left distance is equal to the right distance, or that a difference between the left distance and the right distance falls under a threshold, the image capture device 105A determines that the subject is facing the image capture device 105A. If the image capture device 105A determines that left distance exceeds the right distance by at least a threshold amount, the image capture device 105A determines that the subject is facing right. If the image capture device 105A determines that right distance exceeds the left distance by at least a threshold amount, the image capture device 105A determines that the subject is facing left.

The image capture device 105A can determine the direction that the subject is facing based on the subject's movement. More specifically, the image capture device 105A can receive a third image captured by the image sensor 130, the third image depicting the subject. The image capture device 105A determines a direction of movement of the subject based on the position of the subject in the first image and a position of the subject in the third image. The image capture device 105A determines the direction that the subject is facing in the first image based on the direction of movement of the subject. For instance, if the third image is captured after the first image is captured, and the image capture device 105A determines that the subject appears to move in a particular direction within the photographed scene from the first image to the third image, then the image capture device 105A can determine that the subject is facing that direction. Similarly, if the third image is captured before the first image is captured, and the image capture device 105A determines that the subject appears to move in a particular direction within the photographed scene from the third image to the first image, then the image capture device 105A can determine that the subject is facing that direction.

The visual difference between the first image and the second image can include an adjustment in an amount in negative space adjacent to the subject in the direction that the subject is facing. The adjustment can be an increase in the amount in negative space adjacent to the subject in the direction that the subject is facing. For instance, the image 310 of FIG. 3A can be considered an example of the first image, in which there is very little negative space in front of the subject 305. The image 320 of FIG. 3B may be considered an example of the second image, in which there is more negative space in front of the subject 305 compared to the image 310 of FIG. 3A. The movement of the image capture device 105A, in this example, is a movement from a first position at which the first image 310 is captured to a second position at which the second image 320 is captured. The movement of the device may be a translational movement to the left of the first position. The adjustment can also be a decrease in the amount in negative space adjacent to the subject in the direction that the subject is facing. For instance, if the subject is depicted extremely close to an edge of the frame in an exemplary first image, the visual difference produced based on the guidance can cause the subject to be depicted slightly further from the edge of the frame (e.g., and in some cases closer to the center of the frame) in an exemplary second image.

In some examples, the first image depicts a horizon. The horizon as depicted in the first image can be not level, as in the images 710 and 740 of FIGS. 7A and 7B. The visual difference between the first image and the second image can level the horizon in the second image. For instance, the image 710 of FIG. 7A may be an example of the first image depicting a horizon that is not level. The indicator 730 indicates that the image capture device 105A is to be rotated counter-clockwise along a roll rotational direction by approximately 15 degrees. Performance of the rotation indicated by the indicator 730 before capture of the second image produces the visual difference between the first image and the second image, leveling the horizon in the second image. Similarly, the image 740 of FIG. 7B may be an example of the first image depicting a horizon that is not level. The indicator 760 indicates that the image capture device 105A is to be rotated clockwise along a roll rotational direction by approximately 20 degrees. Performance of the rotation indicated by the indicator 760 before capture of the second image produces the visual difference between the first image and the second image, leveling the horizon in the second image. The image capture device 105A can receive sensor measurement data from one or more pose sensors of an image capture device 105A. The sensor measurement data from one or more pose sensors may be referred to as pose sensor measurement data. The image capture device 105A determines, based on the sensor measurement data, pose of the image capture device 105A. The pose of the image capture device 105A may include the location of the image capture device 105A, the orientation (e.g., pitch, roll, and/or yaw) of the image capture device 105A, or a combination thereof. The movement of the image capture device 105A can then be identified based on the sensor measurement data and/or based on the pose. In some aspects, the one or more pose sensors include at least one of an accelerometer, a gyroscope, a magnetometer, an inertial measurement unit, a global navigation satellite system (GNSS) receiver, and an altimeter.

The image capture device 105A can receive a third image of the scene captured by a second image sensor of the image capture device 105A. The first image of the scene and the third image of the scene can captured within a time window, the time window spanning a period of time. For example, the time window may be one or more picoseconds, one or more nanoseconds, one or more milliseconds, one or more seconds, or a combination thereof. The third image is captured by the second image sensor within a threshold time of the image sensor capturing the first image. The second image sensor has a wider field of view than the image sensor. In some examples, the second image sensor receives light through a second lens, while the image sensor receives light through a first lens. The first lens has a wider angle of view than the second lens. For instance, the first lens may be the wide-angle lens of FIG. 9 while the second lens is the normal lens of FIG. 9. The guidance can be based on a depiction of a portion of the scene in the third image that is not depicted in the first image. For example, the image capture device 105A can identify that the subject is at least partially out of frame of the first image based on the depiction of the subject in the third image. For example, in FIG. 9, the view visible to the normal lens 910 can be an example of the first image, while the view visible to the wide-angle lens 920 is an example of the third image. In this example, most of the subject 940 out of frame of the first image, but most of the subject 940 is in frame of the third image. The movement of the image capture device 105A can be determined based on the third image (the view visible to the wide-angle lens 920) so as to bring the subject 940 into frame for the second image, which in this example is the next image to be captured using the image sensor corresponding to the normal lens. The guidance can, in some cases, be based on a fourth image to be captured by the second image sensor after capturing the third image.

In some examples, the image capture device 105A can receive a third image of the scene captured by a second image sensor of the device within a threshold time of capture of the second image by the image sensor. In some cases, the device can present both the second image and the third image, for example by displaying both side by side or sequentially. The user can select one of the second image and the third image to keep while the other is discarded, or to simply mark as the primary image for this moment while the other is marked as an alternate secondary image.

The guidance can, in some cases, indicate that the device is to remain still (e.g., between capture of the first image and capture of the second image). For instance, if the subject is stationary and already well-positioned from an image composition standpoint, the guidance can indicate that the device is to remain still. Alternately, if the subject is moving and will be better-positioned from an image composition standpoint at a specific future point in time (or range of time), the guidance can indicate that the device is to remain still and capture the second image at (or within a threshold time around) the specific future point in time (or range of time).

In some aspects, the plurality of training images includes a training image that second subject sharing one or more similarities with the subject. The second subject can, in some cases, be the subject. For instance, the subject and the second subject can be the same person, the same monument, the same building, or the same object. The second subject can, in some cases, be a same type of object as the subject. For example, the subject may be a person and the second subject may be a different person. The subject may be a building and the second subject may be a different building with similar dimensions. The subject may be an object and the second subject may be a different object with similar dimensions. The one or more similarities shared between the second subject and the subject include one or more saliency values associated with the second subject being within a predetermined range of one or more saliency values associated with the subject.

The one or more changes to the one or more properties indicated by the guidance can be based on one or more settings for the one or more properties used for capture of the training image. The one or more properties may include a pose of the image capture device 105A, in which case the one or more changes to the one or more properties indicated by the guidance can be based on a pose of the image capture device that captured the training image during (or within a same time window as) capture of the training image. The one or more properties may include one or more image capture settings of the image capture device 105A, in which case the one or more changes to the one or more properties indicated by the guidance can be based on one or more image capture settings used by the image capture device that captured the training image during capture of the training image. The one or more properties may include one or more image processing settings of the image capture device 105A, in which case the one or more changes to the one or more properties indicated by the guidance can be based on one or more image processing settings used by the image capture device that captured the training image applied to the training image upon capture of the training image. The visual difference between the first image and the second image can include the second image being more similar to the training image than the first image is to the training image. Applying the guidance to produce the visual difference can thus cause the second image to be more visually similar to the training image than the first image is to the training image.

The image capture device may identify that the second subject is depicted in the training image using at least one of feature detection, object detection, face detection, feature recognition, object recognition, facial recognition, saliency mapping, another detection or recognition algorithm discussed herein, or a combination thereof.

The indicator for moving the image capture device 105A from the first position to the second position can include one or more location coordinates of the second position, such as latitude, longitude, and/or altitude coordinates. The indicator for moving the image capture device 105A from the first position to the second position can include a map, wherein the map depicts at least one of the first position, the second position, and a path between the first position and the second position. The indicator for moving the image capture device 105A from the first position to the second position can include directions from the first position to the second position, such as walking directions, driving directions, and/or public transit directions.

The one or more changes to the one or more properties of the image capture device 105A may include applying an image capture setting before the image sensor captures the second image. The image capture setting may correspond to at least one of zoom, focus, exposure time, aperture size, ISO, depth of field, analog gain, or f/stop. The image capture setting may be generated using the machine learning model.

The image capture device 105A can determine the image capture setting based on one or more image capture settings used to capture one or more of the plurality of training images. The image capture device 105A can output the guidance by outputting an indicator identifying the one or more changes to the one or more properties of the device corresponding to applying the image capture setting. The image capture device 105A can output the guidance by automatically applying the image capture setting, and thus automatically applying the one or more changes to the one or more properties of the device.

The image capture device 105A can, in some cases, receive the second image captured by the image sensor. The one or more changes to the one or more properties of the image capture device 105A can include applying an image processing setting to the second image during capture, upon capture, within a threshold time after capture, or some combination thereof. The image processing setting can correspond to at least one of brightness, contrast, saturation, gamma, levels, histogram, color adjustments, blur, sharpness, levels, curves, filtering, or cropping. The image processing setting can be generated using the machine learning model.

The image capture device 105A can determine the image processing setting based on one or more image processing settings used to process one or more of the plurality of training images. The image capture device 105A can output the guidance by outputting an indicator identifying the image processing setting and/or guiding application of the image processing setting to the second image during capture of the second image, upon capture of the second image, within a threshold time after capture of the second image, or some combination thereof. The image capture device 105A can output the guidance by automatically applying the image processing setting to the second image during capture of the second image, upon capture of the second image, within a threshold time after capture of the second image, or some combination thereof.

In some cases, at least a subset of the operations 1700 may be performed remotely by one or more network servers of a cloud service that performs image analysis (e.g., step 1710), trains the machine learning model, inputs the first image into the machine learning model (e.g., step 1715), identifies the changes to properties using the machine learning model (e.g., step 1720), generates and/or outputs the guidance (e.g., operation 1720), or some combination thereof.

In some examples, the processes described herein (e.g., processes including operations 600, 800, 1000, 1200, 1400, 1600, 1700, and/or other process(es) described herein) may be performed by a computing device or apparatus. In one example, the processes 600, 800, 1000, 1200, 1400, 1600, and/or 1700 can be performed by the image capture device 105A of FIG. 1. In another example, the processes including operations 600, 800, 1000, 1200, 1400, 1600, and/or 1700 can be performed by the image processing device 105B of FIG. 1. The processes including operations 600, 800, 1000, 1200, 1400, 1600, and/or 1700 can also be performed by the image capture and processing system 100 of FIG. 1. The processes including operations 600, 800, 1000, 1200, 1400, 1600, and/or 1700 can be performed by a computing device with the computing device architecture 1800 shown in FIG. 18. The computing device can include any suitable device, such as a mobile device (e.g., a mobile phone), a wireless communication device, a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, a camera, a camera device, and/or any other computing device with the resource capabilities to perform the processes described herein, including the processes including operations 600, 800, 1000, 1200, 1400, 1600, and/or 1700. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes including operations 600, 800, 1000, 1200, 1400, 1600, and/or 1700 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes including operations 600, 800, 1000, 1200, 1400, 1600, 1700, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 18:
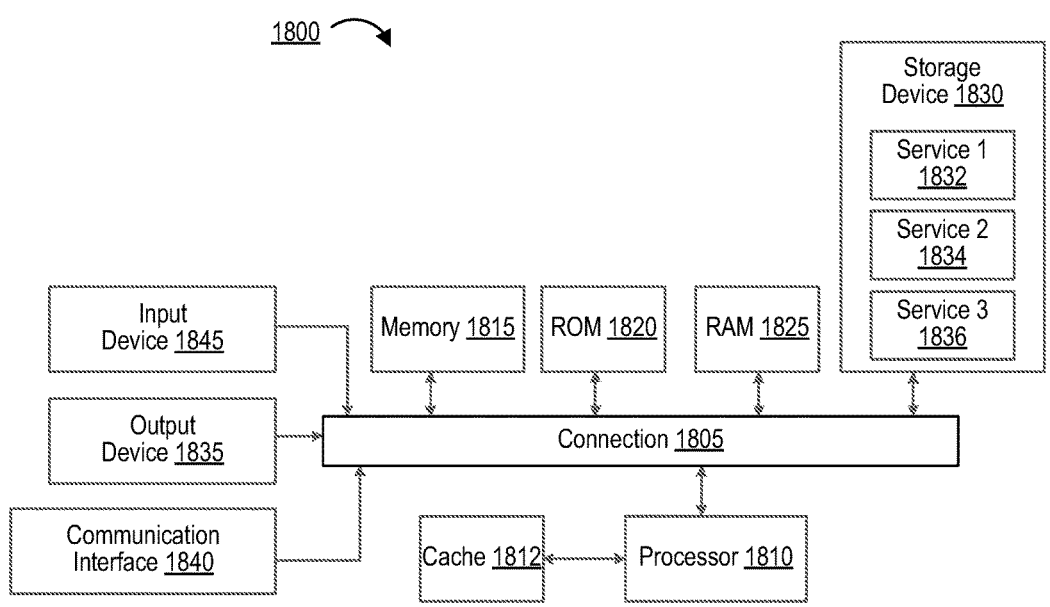
FIG. 18 is a diagram illustrating an example of a system for implementing certain aspects of the present technology.

FIG. 18 is a diagram illustrating an example of a system for implementing certain aspects of the present technology. In particular, FIG. 18 illustrates an example of computing system 1800, which can be for example any computing device making up internal computing system, a remote computing system, a camera, or any component thereof in which the components of the system are in communication with each other using connection 1805. Connection 1805 can be a physical connection using a bus, or a direct connection into processor 1810, such as in a chipset architecture. Connection 1805 can also be a virtual connection, networked connection, or logical connection.

In some embodiments, computing system 1800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1800 includes at least one processing unit (CPU or processor) 1810 and connection 1805 that couples various system components including system memory 1815, such as read-only memory (ROM) 1820 and random access memory (RAM) 1825 to processor 1810. Computing system 1800 can include a cache 1812 of high-speed memory connected directly with, in close proximity to, or integrated as part of processor 1810.

Processor 1810 can include any general purpose processor and a hardware service or software service, such as services

1832, 1834, and 1836 stored in storage device 1830, configured to control processor 1810 as well as a special-purpose processor where software instructions are incorporated into the actual processor design. Processor 1810 may essentially be a completely self-contained computing system, containing multiple cores or processors, a bus, memory controller, cache, etc. A multi-core processor may be symmetric or asymmetric.

To enable user interaction, computing system 1800 includes an input device 1845, which can represent any number of input mechanisms, such as a microphone for speech, a touch-sensitive screen for gesture or graphical input, keyboard, mouse, motion input, speech, etc. Computing system 1800 can also include output device 1835, which can be one or more of a number of output mechanisms. In some instances, multimodal systems can enable a user to provide multiple types of input/output to communicate with computing system 1800. Computing system 1800 can include communications interface 1840, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1840 may also include one or more Global Navigation Satellite System (GNSS) receivers or transceivers that are used to determine a location of the computing system 1800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1830 can include software services, servers, services, etc., that when the code that defines such software is executed by the processor 1810, it causes the system to perform a function. In some embodiments, a hardware service that performs a particular function can include the software component stored in a computer-readable medium in connection with the necessary hardware components, such as processor 1810, connection 1805, output device 1835, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. An apparatus for guiding image capture, the apparatus comprising:
one or more memory units storing instructions; and
one or more processors that execute the instructions, wherein execution of the instructions by the one or more processors causes the one or more processors to:
receive a first image of a scene captured by an image sensor;
identify a subject depicted in the first image;
receive pose sensor measurement data from one or more pose sensors;
determine a pose of the apparatus based on the pose sensor measurement data;
input the first image into a machine learning model, the machine learning model trained using a plurality of training images with identified subjects;
identify, at least in part using the pose of the apparatus as an input to the machine learning model, one or more changes to one or more properties associated with image capture that cause a visual difference between the first image and a second image to be captured by the image sensor after capturing the first image; and
output guidance indicative of the one or more changes to produce the visual difference before the image sensor captures the second image.

2. The apparatus of claim 1, wherein the apparatus is at least one of a mobile device, a wireless communication device, or a camera.

3. The apparatus of claim 1, wherein the apparatus includes a display configured to display at least the second image.

4. The apparatus of claim 1, further comprising:
one or more connectors coupled to the image sensor, wherein the one or more processors receive the first image from the image sensor through the one or more connectors.

5. The apparatus of claim 1, further comprising:
the image sensor.

6. The apparatus of claim 1, wherein identifying the subject depicted in the first image includes performing at least one of feature detection, object detection, face detection, feature recognition, object recognition, facial recognition, or generation of a saliency map.

7. The apparatus of claim 1, wherein execution of the instructions by the one or more processors causes the one or more processors to further:
receive the second image from the image sensor after outputting the guidance; and
output the second image, wherein outputting the second image includes at least one of displaying the second image using a display or transmitting the second image using a transmitter.

8. The apparatus of claim 1, wherein identifying the one or more changes to the one or more properties associated with image capture includes identifying a movement of the apparatus from a first position to a second position, wherein outputting the guidance includes outputting an indicator for moving the apparatus from the first position to the second position, wherein the indicator identifies at least one of a translational direction of the movement, a distance between the first position and the second position, a rotational direction of the movement, or a rotational angle of the movement.

9. The apparatus of claim 8, wherein the second position is identified using the machine learning model.

10. The apparatus of claim 8, wherein the indicator includes one or more location coordinates of the second position.

11. The apparatus of claim 1, wherein the indicator includes at least one of a visual indicator, an audio indicator, or a vibrational indicator.

12. The apparatus of claim 1, wherein the visual difference between the first image and the second image levels a horizon in the second image, wherein the horizon is not level as depicted in the first image.

13. The apparatus of claim 1, wherein the pose of the apparatus includes at least one of a location of the apparatus or an orientation of the apparatus, wherein the one or more pose sensors include at least one of a location sensor configured to measure the location of the apparatus or an orientation sensor configured to measure the orientation of the apparatus.

14. The apparatus of claim 1, wherein execution of the instructions by the one or more processors causes the one or more processors to further:

determine a position of the subject in the first image; and determine a direction that the subject is facing in the first image based on at least one of a relative positioning of two features of the subject and a movement direction in which the subject moves between the first image and a third image captured by the image sensor, wherein identifying the one or more changes to the one or more properties of the apparatus is based on the position of the subject in the first image and the direction that the subject is facing in the first image, wherein the visual difference between the first image and the second image includes an adjustment in an amount of negative space adjacent to the subject in the direction that the subject is facing.

15. The apparatus of claim 1, wherein execution of the instructions by the one or more processors causes the one or more processors to further:

receive a third image of the scene captured by a second image sensor, wherein the first image of the scene and the third image of the scene are captured within a time window, wherein the second image sensor has a wider field of view than the image sensor, wherein the guidance is based on a depiction of a portion of the scene in the third image that is not depicted in the first image.

16. The apparatus of claim 1, wherein the guidance indicates that the apparatus is to remain still between capture of the first image and capture of the second image.

17. The apparatus of claim 1, wherein the plurality of training images includes a training image that depicts at least one of the subject and a second subject sharing one or more similarities with the subject, wherein the one or more changes to the one or more properties indicated by the guidance are based on one or more settings for the one or more properties used for capture of the training image.

18. The apparatus of claim 17, wherein the one or more similarities shared between the second subject and the subject include one or more saliency values associated with the second subject being within a predetermined range of one or more saliency values associated with the subject.

19. The apparatus of claim 17, wherein the visual difference between the first image and the second image includes the second image being more similar to the training image than the first image is to the training image.

20. The apparatus of claim 1, wherein the one or more changes to the one or more properties associated with image capture include applying an image capture setting before the image sensor captures the second image, wherein the image capture setting corresponds to at least one of zoom, focus, exposure time, aperture size, ISO, depth of field, analog gain, or f/stop.

21. The apparatus of claim 20, wherein outputting the guidance includes outputting an indicator identifying the one or more changes to the one or more properties associated with image capture corresponding to applying the image capture setting.

22. The apparatus of claim 20, wherein outputting the guidance includes automatically applying the one or more changes to the one or more properties associated with image capture corresponding to applying the image capture setting.

23. The apparatus of claim 1, wherein execution of the instructions by the one or more processors causes the one or more processors to further:

receive the second image captured by the image sensor, wherein the one or more changes to the one or more properties associated with image capture include applying an image processing setting to the second image, wherein the image processing setting corresponds to at least one of brightness, contrast, saturation, gamma, levels, histogram, color adjustments, blur, sharpness, levels, curves, filtering, or cropping.

24. A method of guiding image capture, the method comprising:

receiving a first image of a scene captured by an image sensor of an image capture device;

identifying a subject depicted in the first image;

receiving pose sensor measurement data from one or more pose sensors;

determining a pose of the image capture device based on the pose sensor measurement data;

inputting the first image into a machine learning model, the machine learning model being trained using a plurality of training images with identified subjects;

identifying, at least in part using the pose of the image capture device as an input to the machine learning model, one or more changes to one or more properties of the image capture device that cause a visual difference between the first image and a second image to be captured by the image sensor after capturing the first image; and outputting guidance indicative of the one or more changes to produce the visual difference before the image sensor captures the second image.

25. The method of claim 24, wherein the method is performed by the image capture device, wherein the image capture device is at least one of a mobile device, a wireless communication device, or a camera.

26. The method of claim 24, wherein identifying the subject depicted in the first image includes performing at least one of feature detection, object detection, face detection, feature recognition, object recognition, facial recognition, or generation of a saliency map.

27. The method of claim 24, wherein identifying the one or more changes to the one or more properties associated with image capture includes identifying a movement of the apparatus from a first position to a second position, wherein outputting the guidance includes outputting an indicator for moving the apparatus from the first position to the second position, wherein the indicator identifies at least one of a translational direction of the movement, a distance between the first position and the second position, a rotational direction of the movement, or a rotational angle of the movement.

28. The method of claim 27, wherein the second position is identified using the machine learning model.

29. The method of claim 24, wherein the visual difference between the first image and the second image levels a horizon in the second image, wherein the horizon is not level as depicted in the first image.

30. The method of claim 24, further comprising:

determining a position of the subject in the first image; and determining a direction that the subject is facing in the first image based on at least one of a relative positioning of two features of the subject and a movement direction in which the subject moves between the first image and a third image captured by the image sensor, wherein identifying the one or more changes to the one or more properties of the apparatus is based on the position of the subject in the first image and the direction that the subject is facing in the first image, wherein the visual difference between the first image and the second image includes an adjustment in an amount of negative space adjacent to the subject in the direction that the subject is facing.

31. The method of claim 24, further comprising:
receiving a third image of the scene captured by a second image sensor, wherein the first image of the scene and the third image of the scene are captured within a time window, wherein the second image sensor has a wider field of view than the image sensor, wherein the guidance is based on a depiction of a portion of the scene in the third image that is not depicted in the first image.

32. The method of claim 24, wherein the plurality of training images includes a training image that depicts at least one of the subject and a second subject sharing one or more similarities with the subject, wherein the one or more changes to the one or more properties indicated by the guidance are based on one or more settings for the one or more properties used for capture of the training image, wherein the visual difference between the first image and the second image includes the second image being more similar to the training image than the first image is to the training image.

33. The method of claim 32, wherein the one or more similarities shared between the second subject and the subject include one or more saliency values associated with the second subject being within a predetermined range of one or more saliency values associated with the subject.

34. The method of claim 24, wherein the one or more changes to the one or more properties associated with image capture include applying an image capture setting before the image sensor captures the second image, wherein the image capture setting corresponds to at least one of zoom, focus, exposure time, aperture size, ISO, depth of field, analog gain, or f/stop.

35. The method of claim 24, further comprising:
receiving the second image captured by the image sensor, wherein the one or more changes to the one or more properties associated with image capture include applying an image processing setting to the second image, wherein the image processing setting corresponds to at least one of brightness, contrast, saturation, gamma, levels, histogram, color adjustments, blur, sharpness, levels, curves, filtering, or cropping.

* * * * *